US008712927B2

(12) United States Patent
Danai et al.

(10) Patent No.: US 8,712,927 B2
(45) Date of Patent: Apr. 29, 2014

(54) SYSTEMS AND METHODS FOR PARAMETER ADAPTATION

(75) Inventors: Kourosh Danai, Amherst, MA (US); James McCusker, Sunderland, MA (US)

(73) Assignee: University of Massachusetts, Boston, MA (US)

(*) Notice: Subject to any disclaimer, the term of this patent is extended or adjusted under 35 U.S.C. 154(b) by 751 days.

(21) Appl. No.: 12/220,446

(22) Filed: Jul. 24, 2008

(65) Prior Publication Data

US 2010/0023464 A1  Jan. 28, 2010

(51) Int. Cl.
*G06F 15/18* (2006.01)

(52) U.S. Cl.
USPC .......................................... 706/12

(58) Field of Classification Search
USPC .......................................... 706/12
See application file for complete search history.

(56) References Cited

U.S. PATENT DOCUMENTS

| | | | | |
|---|---|---|---|---|
| 6,698,009 | B1* | 2/2004 | Pasadyn et al. | 700/109 |
| 7,953,147 | B1* | 5/2011 | Wen | 375/240.03 |
| 2002/0156542 | A1* | 10/2002 | Nandi | 700/30 |
| 2004/0025000 | A1* | 2/2004 | Wise et al. | 712/300 |
| 2006/0120217 | A1* | 6/2006 | Wu et al. | 367/32 |
| 2007/0192656 | A1* | 8/2007 | Goessel et al. | 714/719 |
| 2007/0274152 | A1* | 11/2007 | Rees | 367/7 |
| 2007/0299746 | A1* | 12/2007 | Haley et al. | 705/28 |
| 2008/0082195 | A1* | 4/2008 | Samardzija | 700/109 |
| 2008/0125669 | A1* | 5/2008 | Suffin et al. | 600/544 |
| 2008/0219253 | A1* | 9/2008 | Pozhenko et al. | 370/389 |
| 2008/0281584 | A1* | 11/2008 | Hetherington et al. | 704/200 |
| 2009/0322916 | A1* | 12/2009 | Wang et al. | 348/254 |

OTHER PUBLICATIONS

Fredrik Gustafsson, "Adaptive Filtering and Change Detection", Year 2000, Jon Wiley and Sons, Ltd.*
Adaptive Filtering and Change Detection Fredrik Gustafsson.*
Ghanem et al., "A wavelet-based approach for model and parameter identification of nonlinear system," International Journal of Non-Linear Mechanics 36 (2001) 835-859.
Ghanem et al., "A wavelet-based approach for the identification of linear time-varying dynamical systems," Journal of Sound and Vibration (2000) 234(4), 555-576.
Rabe-Hasketh et al., "Maximum likelihood estimation of limited and discrete dcependent variable models with nested random effects," Journal of Econometrics 128 (2005) 301-323.
Weiss et al., "Efficient and responsible use of prior information in inverse methods," Ground Water, vol. 36, No. 1, Jan.-Feb. 1998.

(Continued)

*Primary Examiner* — Kakali Chaki
*Assistant Examiner* — Ababacar Seck
(74) *Attorney, Agent, or Firm* — McCarter & English, LLP

(57) ABSTRACT

A method of parameter adaptation is used to modify the parameters of a model to improve model performance. The model separately estimates the contribution of each model parameter to the prediction error. It achieves this by transforming to the time-scale plane the vectors of output sensitivities with respect to model parameters and then identifying the regions within the time-scale plane at which the dynamic effect of individual model parameters is dominant on the output. The method then attributes the prediction error in these regions to the deviation of a single parameter from its true value as the basis of estimating individual parametric errors. The proposed Parameter Signature Isolation Method (PARSIM) then uses these estimates to adapt individual model parameters independently of the others, implementing, in effect, concurrent adaptation of individual parameters by the Newton-Raphson method in the time-scale plane.

24 Claims, 18 Drawing Sheets

(56) References Cited

OTHER PUBLICATIONS

Moreira et al., "IDIAP Technical Report—neural networks with adaptive learning rate and momentum terms," Institute Dalle Molle D'Intelligence Artificielle Perspective Case Postale 609—1920 Martigny—Valais—Suisse. Idaiap#idiap.ch.

Rasmussen et al., "Gaussian processes for machine learning," MIT Press, 2006. www.gaussianprocess.org/gpml.

* cited by examiner

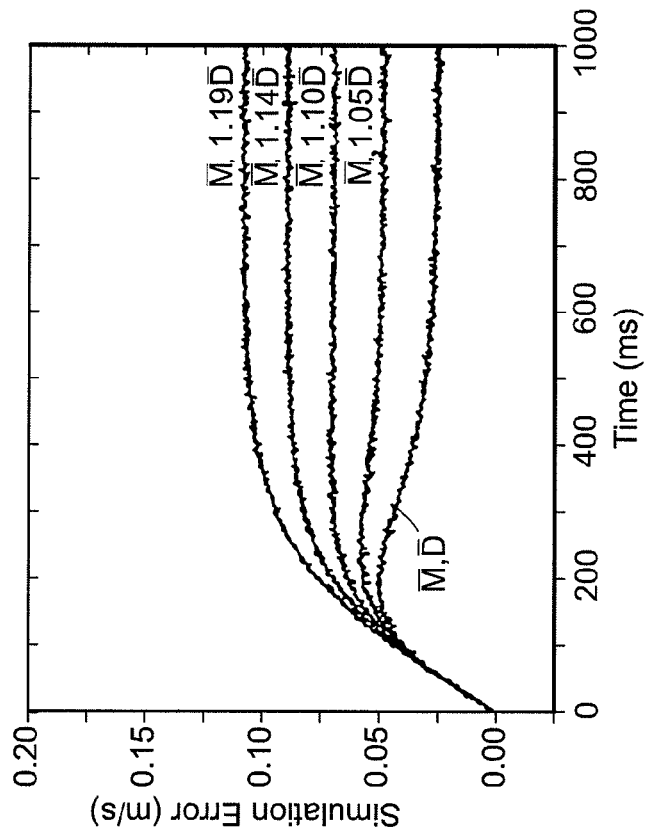
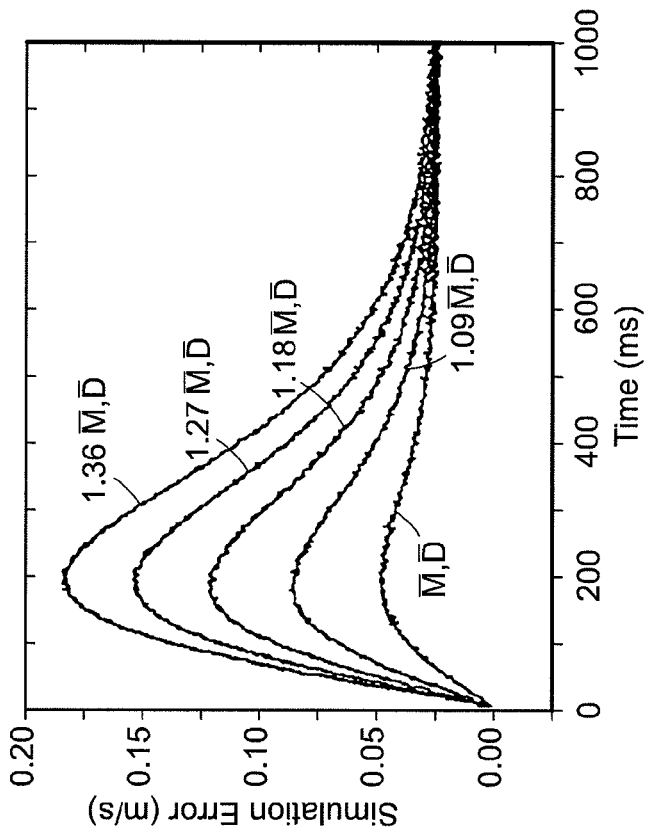
FIG. 2A
FIG. 2B

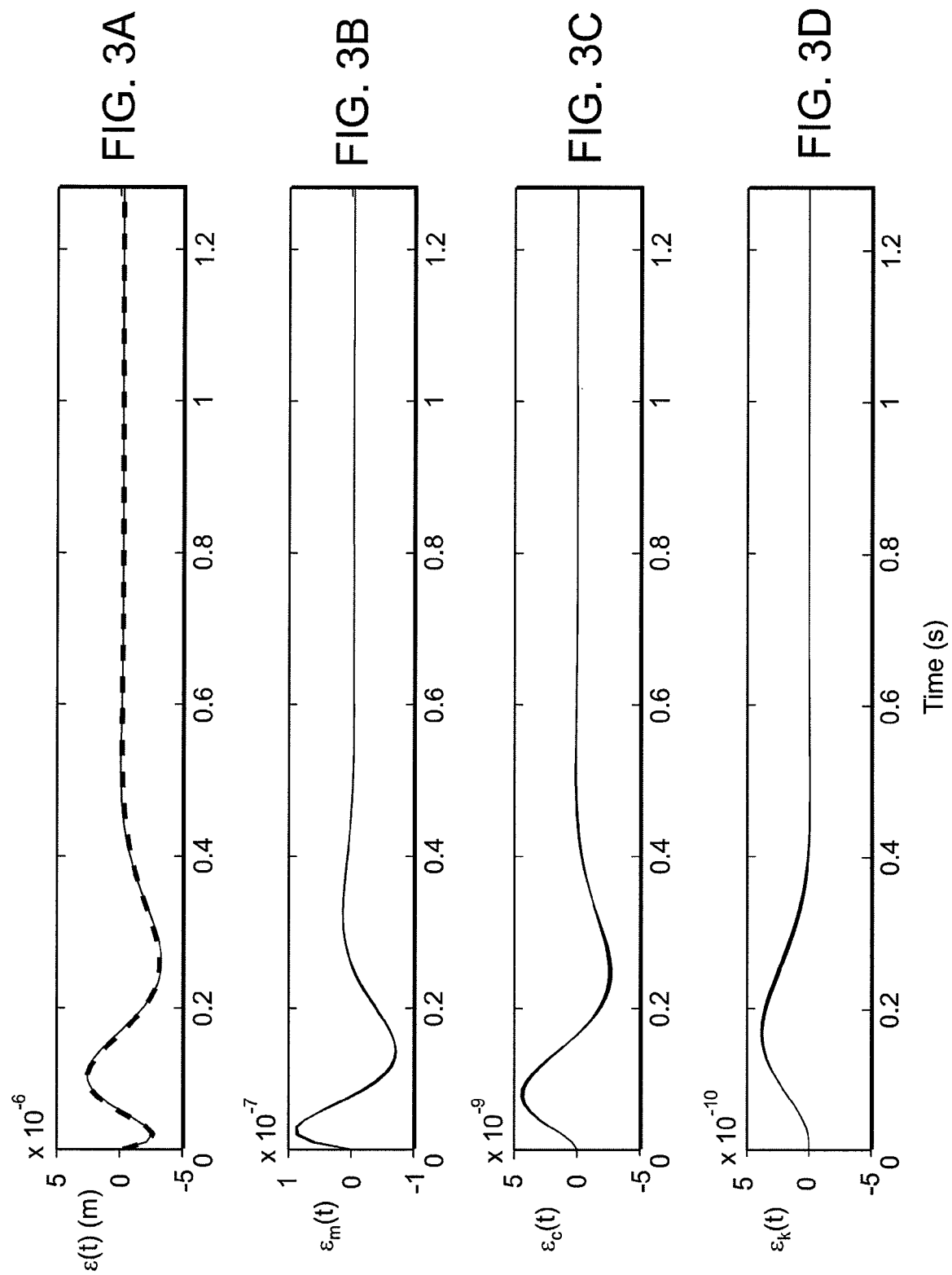

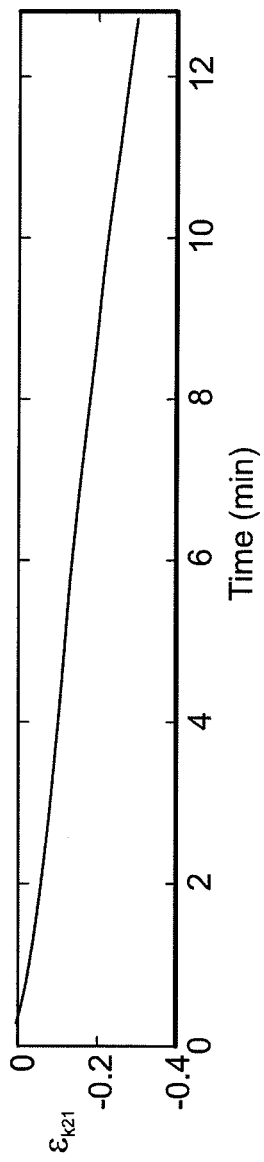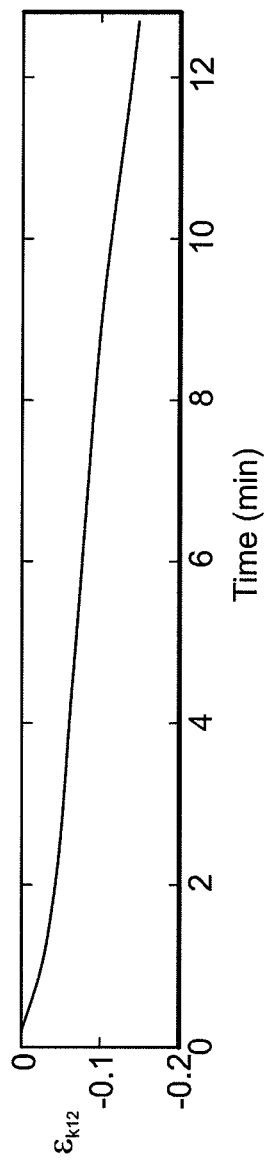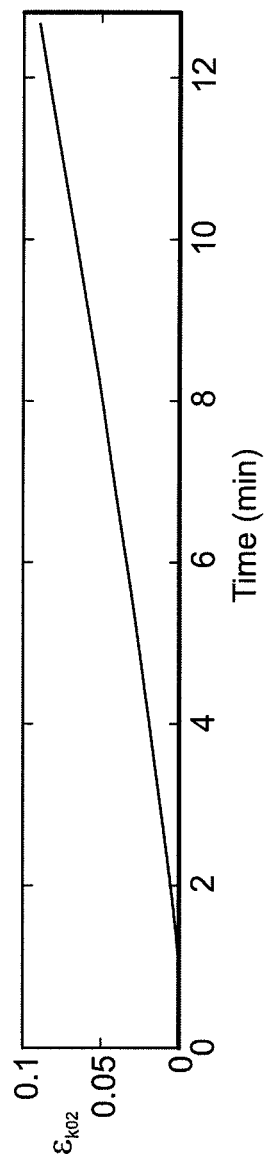

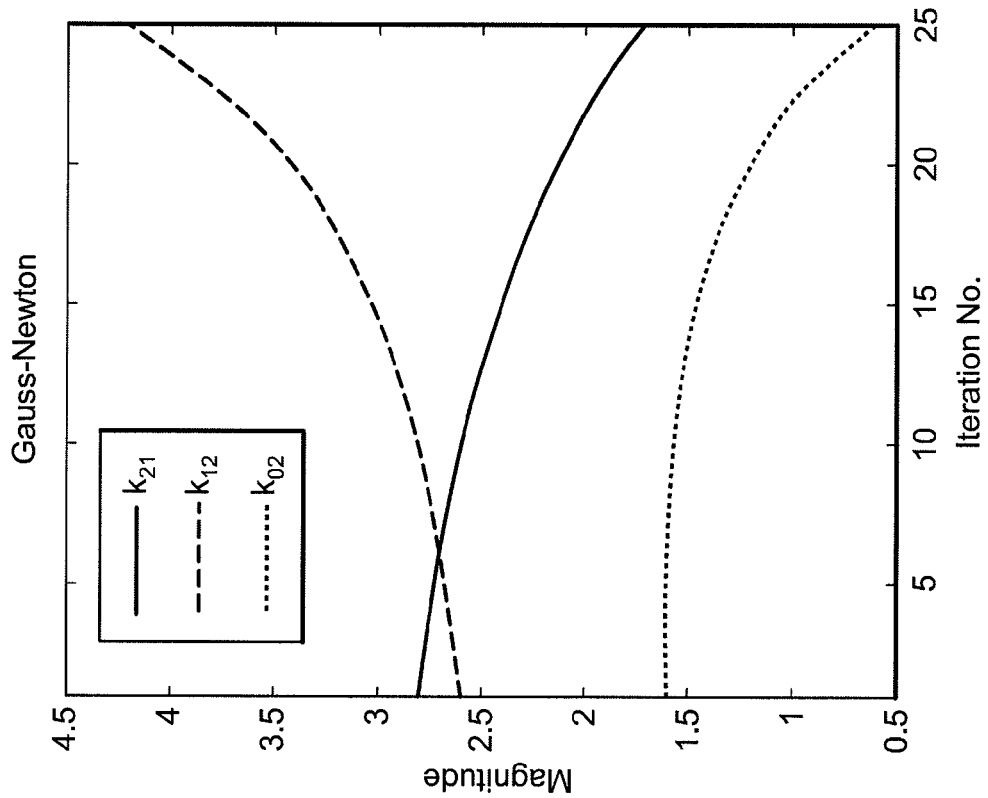
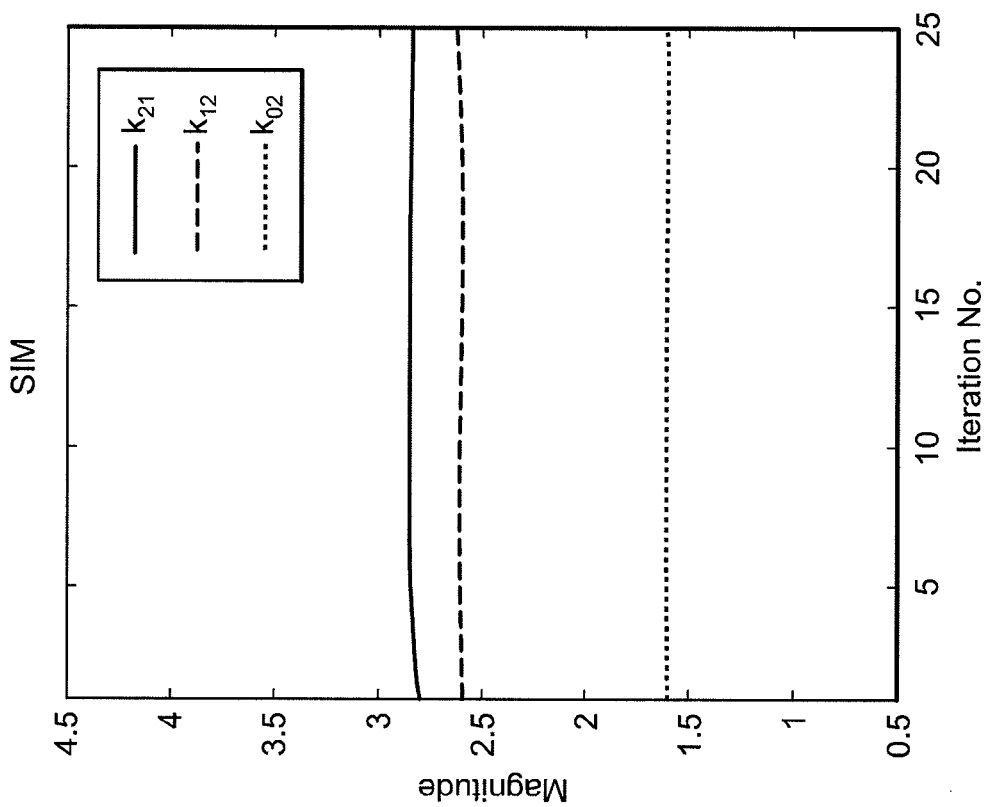
FIG. 15B
FIG. 15A

SYSTEMS AND METHODS FOR PARAMETER ADAPTATION

BACKGROUND OF THE INVENTION

Engineers and scientists are increasingly turning to sophisticated computer-based simulation models to predict and optimize process behavior in virtual environments. Yet, to be effective, simulation models need to have a high degree of accuracy to be reliable. An important part of simulation development, therefore, is parameter adaptation wherein the values of model parameters (i.e., model coefficients and exponents) are adjusted so as to maximize the accuracy of simulation relative to the experimental data available from the process. If parameter adaptation leads to acceptable predictions, the model is declared valid. Otherwise, the model is refined to higher levels of complexity so as to provide an expanded basis for parameter adaptation. The availability of an efficient and reliable parameter adaptation method, therefore, is crucial to model validation and simulation development.

Methods of parameter adaptation typically seek solutions to a set of parameters e that minimize a loss function $V(\Theta)$ over the sampled time T, as set forth in the relation:

$$\hat{\Theta} = \hat{\Theta}(Z^N = \arg_\Theta \min V(\Theta, Z^N)) \quad (1)$$

where $Z^N$ comprises the measured outputs y(t), and $$V(\Theta, Z^N) = \int_Q^T L(\varepsilon(t))dt$$

is a scalar-valued (typically positive) function of the prediction error $E(t)=y(t)-\hat{y}(t)$ between the measured outputs y(t) and model outputs $\hat{y}(t)=M\theta(u(t))$ with u(t) being the input applied to the process. In cases where the process can be accurately represented by a model that is linear in parameters, or when the nonlinear model is transformed into a functional series that is linear in parameters, each model output can be defined as a linear function of the parameters to yield an explicit gradient of the loss function in terms of the parameters for regression analysis. Otherwise, parameter adaptation becomes analogous to a multi-objective (due to multiplicity of outputs) nonlinear optimization, wherein the solution is sought through a variety of methods, such as gradient-descent, genetic algorithms, convex programming, Monte Carlo, etc. In all these error minimization approaches a search of the entire parameter space is conducted for the solution.

However, not all model parameters are erroneous. Neither is the indiscriminate search of the entire parameter space practical for complex simulation models. As a remedy, experts use a manual approach of selecting parameters that they speculate to most effectively reduce each prediction error. They usually select the suspect parameters by the similarity of the shape of their dynamic effect to the shape of the transient prediction error. They then alter these parameters within their range in the direction that are expected to reduce the error and run new simulations to evaluate the effect of these parameter changes. If the new parameter values improve the results, they are further adjusted until they no longer improve the simulation. This process is followed for another set of suspect parameters and repeated for all the others until satisfactory results are obtained. If at the end of parameter adaptation adequate precision is attained, the model is declared valid and the adjusted model is presumed to represent the process. Even though this manual approach lacks a well-defined procedure and is tedious and time-consuming, it provides the advantage of targeted (selective) adaptation wherein each parameter is adapted separately.

A continuing need exists, however, for further improvements in model development and operation.

SUMMARY OF THE INVENTION

The present invention provides a method of parameter adaptation or parameter selection that is used to adjust parameter values. A preferred embodiment of this method involves the use of a transformation of operating parameters into a domain and selectively varying parameter values in the domain to determine a set of adjusted parameter values that can be used to operate a particular system or process.

A preferred embodiment uses a transformation that identifies regions of the time-scale plane at which the effect of each parameter on the prediction error is dominant. It then approximates the prediction error in each region in terms of a single parameter to estimate the corresponding parameter's deviation from its "true" value, i.e., the parameter value that can be used to more accurately represent or model a selected system or method. Using these estimates, it then adapts individual parameters independently of the others in direct contrast to traditional error minimization of regression. This process can be referred to as the Parameter Signature Isolation Method (PARSIM), which takes the form of the Newton-Raphson method applied to single-parameter models, has been shown to provide better precision than the Gauss-Newton method in presence of noise. PARSIM is also found to produce more consistent and precise estimates of the parameters in the absence of rich excitation.

A preferred embodiment of the invention uses a processing system to perform the transformation and determine parameter values. The processing system can be a computer programmed to perform parameter adaptation for a variety of different applications. The system performs a process sequence in accordance with a programmed set of instructions that includes transformation to a selected domain and minimization of error associated with a given parameter value.

An important feature of the preferred system and method of the invention is that different parameter values can be determined separately from each other.

BRIEF DESCRIPTION OF THE DRAWINGS

FIGS. 2A and 2B show the simulation errors resulted from univariate changes to parameters M and D respectively, where M and D denote their nominal values in the initial simulation;

FIGS. 3A-3D show the impulse response prediction error of the mass-spring-damper model in Eq. (12) (top plot solid line) and its approximation by the weighted sum of its parameter effects according to Eq. (11) (top plot dashed line); and 3B-3D show the parameter effects of m, c and k at several nominal parameter values;

FIGS. 14A-14C graphically illustrate the parameter effects of $K_{21}$, $K_{12}$ and $K_{02}$ in the drug kinetics model of Carson et al.;

FIGS. 15A and 15B illustrate the adapted parameter of the drug kinetics model of Carson et al provided by the present invention (PARSIM) and the Gauss Newton method, respectively;

DETAILED DESCRIPTION OF THE INVENTION

Figure 1A:
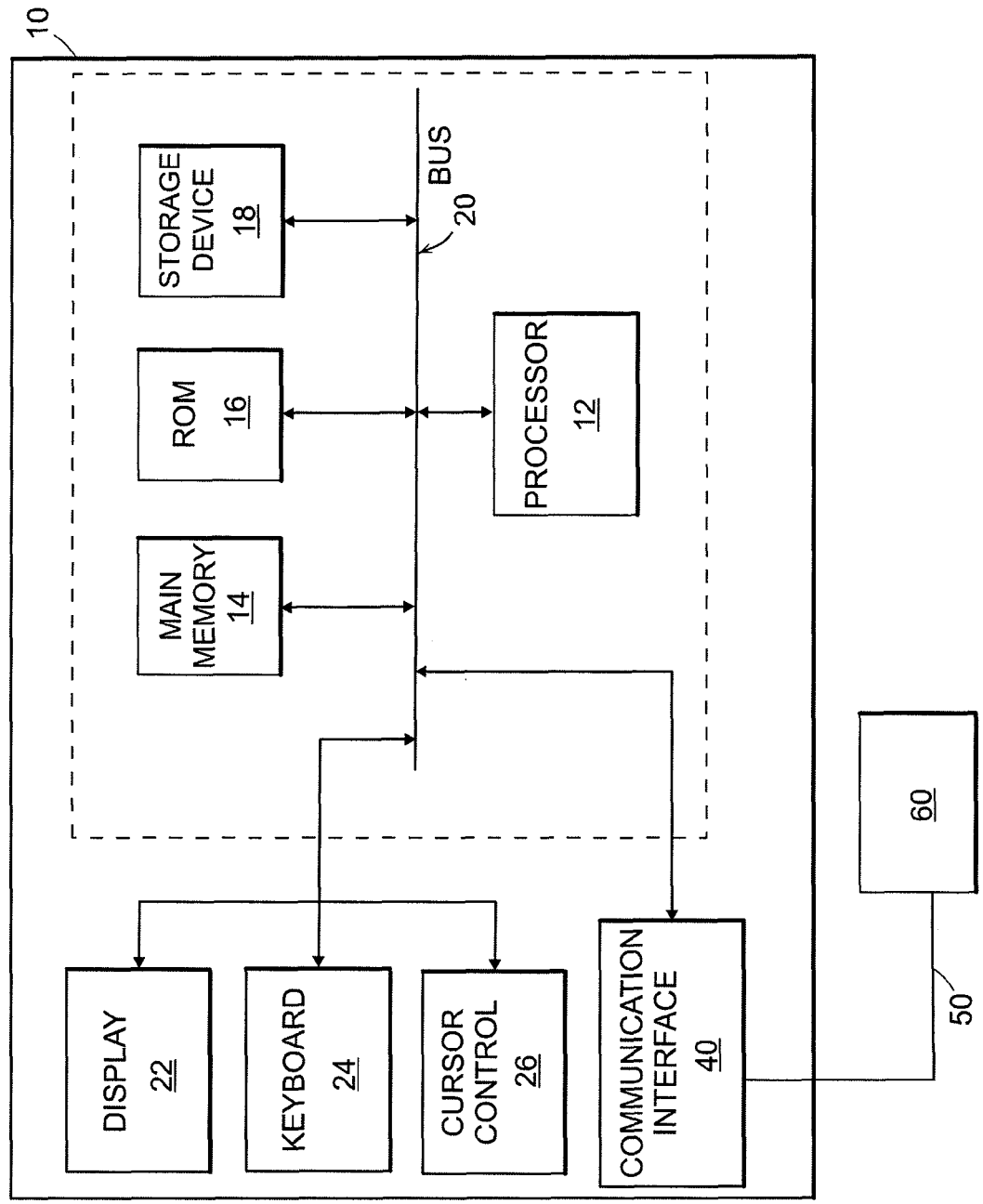
FIG. 1A shows a processing system used to perform preferred embodiments of the present invention.

Preferred embodiments of the present invention involve the use of computer systems or data processors that perform the processing functions useful in determining the parameter values that can improve model performance. Such a system 10 is shown in connection with FIG. 1A. The system 10 can include a processor 12 that can interface with a main memory 14, a read-only memory (ROM) 16, or other storage device or medium 18 via a bus 20. A user interface, such as, a keyboard 24 or cursor control 26 can be used to program processor 12 or to access data stored in memory. A display 22 can be used with the graphical user interface described in FIG. 1B. A communication interface 40 can be used for a network interface or to provide a wired or wireless connection 50 to other computer systems with application 60 to access the parameter adaptation capabilities of the system 10. The processor 12 can be programmed to perform operations in accordance with the present invention using a programming language, such as MATLAB® available from The Mathworks of Natick, Mass. MATLAB® versions 6.5 or 7.4 can be used, for example, to implement the methods described herein. The system 10 preferably has at least 512 MB of RAM and a processor, such as an Intel Pentium® 4 or AMD Athlon® 64. The system 10 can include at least a 16 bit OpenGL graphics adapter and utilizes about 100 MB of disk space from the programs used to perform operations in accordance with the invention, although reduced storage requirements can be implemented, particularly when the invention is implemented as a standalone executable file that is independent from the MATLAB® or other operating environment. To interact with a particular simulation program operating on the same or some external processor, the outputs are preferably in either .dat or .mat form to facilitate operation with a preferred embodiment. The software is configured to access and adjust the model parameters within a simulation model, for example, to perform the desired adaptation.

Preferred embodiments of the present invention can be used for a variety of applications 60 including: controller tuning, simulation models, learning methods, financial models and processes communication systems and feedback control systems, such as, active vibration control.

Controllers used in a variety of equipment and machinery used in manufacturing, for example, have multiple outputs that require timing for proper operation of the system. A preferred embodiment of the present invention can be installed on such a system or it can be connected to the system 10 of FIG. 1A by interface 40.

simulation programs are used for many applications including computer games, biological systems, drug design, aircraft design including aircraft engines, etc.

Learning systems, such as, neural networks, involve adjustment of operating parameters to improve system operation. Neural networks, which can rely upon the gradient of the output, can utilize a preferred embodiment of the invention for correction of neural network parameters.

Financial modeling and arbitrage methods in the financial markets can be improved with the use of the present invention. Statistical arbitrage typically relies on regression techniques can be replaced by a preferred embodiment of the invention to provide improved financial modeling and market operations parameter adaptation.

Parameter adaptation is used in communication systems to provide improved operation control. A preferred embodiment of the present invention can modify the operating parameters of such a system to provide improved system operation. Feedback systems generally can employ the present invention to improve operational control, such as in active vibration control where sensors are used to measure vibration and the measured data is processed to provide adjusted operating parameters of the system causing vibration.

Figure 1B:
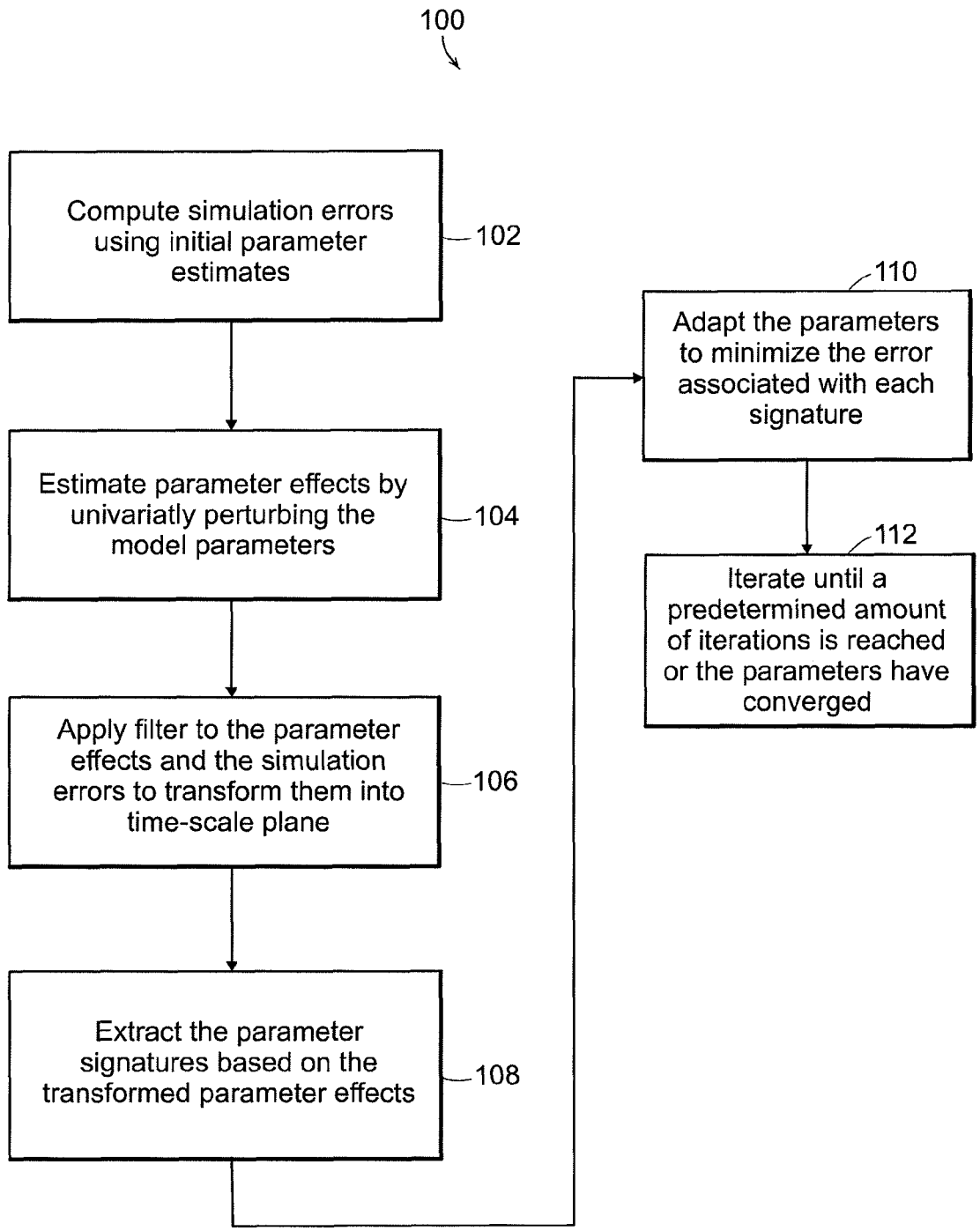
FIG. 1B shows a method of performing the adaptation method in accordance with a preferred embodiment of the invention.
Figure 1C:
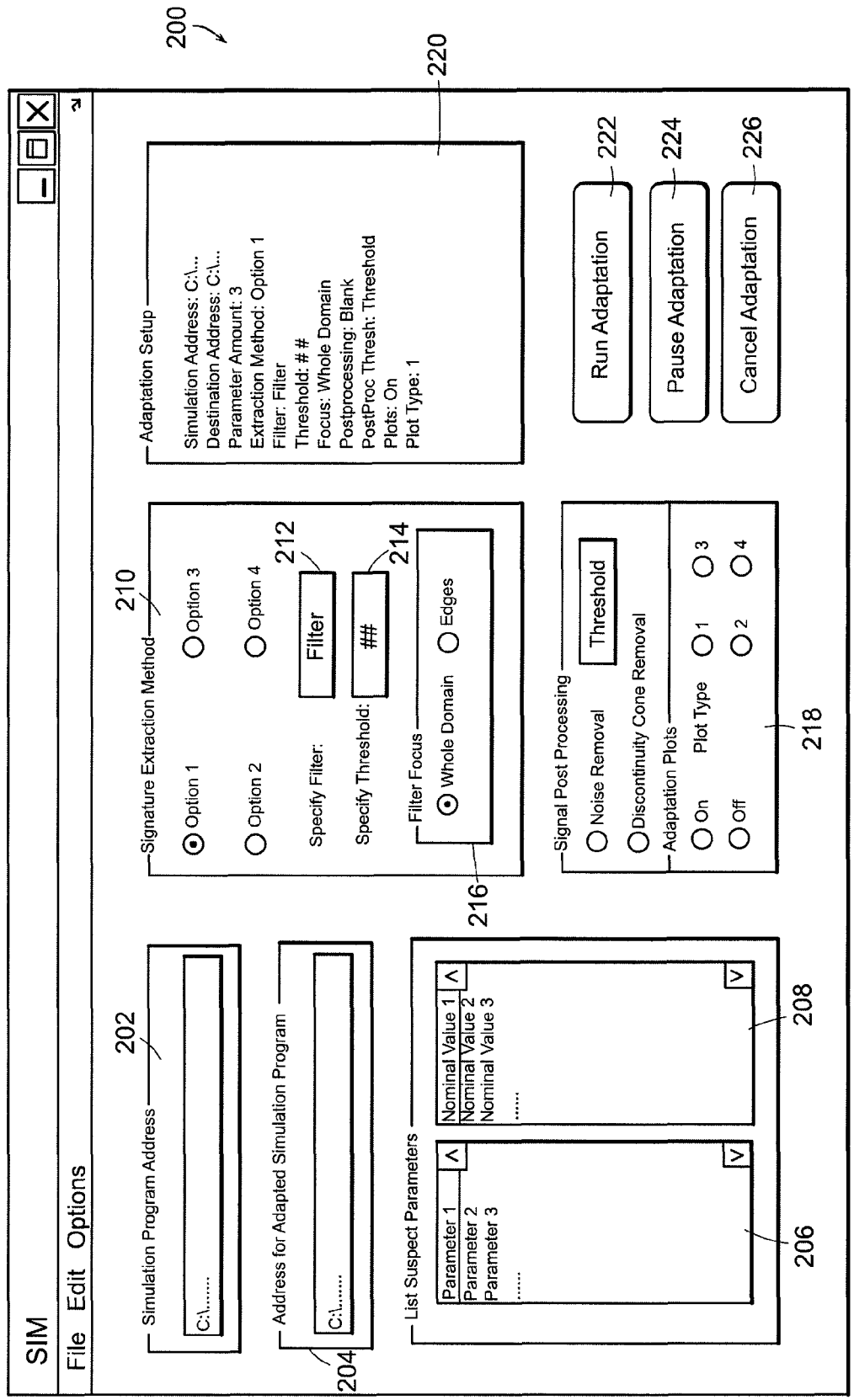
FIG. 1C shows a graphical user interface to operate the system in accordance with preferred embodiments of the invention.

Illustrated in FIG. 1B is a process sequence 100 illustrating a preferred method of performing parameter adaptation in accordance with a preferred embodiment of the invention. Initially, a user computes 102 simulation errors using estimates of initial parameters. The user then univariately perturbs or varies 104 the parameters before transforming 106 them into a domain from which the signature of parameters can be extracted 108. The parameters can then be adapted or varied 110 to minimize error. This process can be iterated 112 until convergence of parameter values. Shown in FIG. 1C is a screen 200 illustrating a graphical user interface (GUI) used in performing the method illustrated in FIG. 1C. The screen includes data entry and process selection features including the program address 202, the adapted simulation program 204, parameters 206 and values 208 thereof. Features included signature extraction method options 210, filter selection 212 with thresholding 214 and focus 216. Post processing 218, such as, noise removal and plot types can be selected. A list of set-up features 220 can be displayed and run 222, pause 224 and cancel 226 icons can be selected.

The concept of determining model parameters signature isolation is based on selection of the parameters by matching the features of the variation or error to those of the parameter effects. The approach is illustrated in the context of the following model representing the velocity of a submarine, as $$\dot{v}(t) = -\frac{\rho A C_d}{2M} v^2(t) + \frac{1}{M} F(t) \quad (1)$$

where v(t) represents velocity, ρ the water density, A the cross-sectional area of the boat, M its mass, $C_d$ the drag coefficient, and F(t) its thrust. Since the drag parameters ρ, A, and $C_d$ are grouped together, they are individually nonidentifiable and only their product (parameter group) $D=\rho A C_d$ can be numerically adjusted. The conditions for mutual identifiability of parameters as a precondition to signature extraction will be specified hereinafter.

The prediction errors resulting from univariate changes in parameters M and D are shown in FIGS. 2A and 2B. From an examination of these error shapes, one can observe that M predominantly affects the transient part of the error (the left-hand plot), whereas the lumped drag parameter D affects its steady-state value (the right-hand plot). This indicates, among other things, the uniqueness of the effects of the two parameters, hence, their mutual identifiability. Using the error-shape changes in FIGS. 2A and 2B as mental models, the expert can refer to the original prediction error, the plot marked by "$\overline{M},\overline{D}$", and conclude that because both error types exist in the original prediction error, both parameters $\overline{M}$ and $\overline{D}$ need to be adjusted.

The ability to record the prediction error shapes as mental models is a cognitive trait that computers typically do not possess. Therefore, the parameter signatures need to be defined in terms of the quantitative features of the error shapes. As it is shown hereinafter, such a quantification can be performed in the time-scale plane by filtering the error and output sensitivities to the parameters.

Let the model $M_\Theta$ (u(t)) accurately represent the process. Then the model outputs $\hat{y}(t,u(t))=M_\Theta(u(t))$ generated with the same input u(t) applied to the process will match the measured process outputs y(t, u(t)) (in mean-square sense) if the model parameters $\Theta=[\theta_1,\ldots,\theta_Q]^T \in R^Q$ match the true parameters $\Theta^*=[\theta_1^*,\ldots,\theta_Q^*]^T$; i.e., $$y(t,u(t))=\hat{y}(t,u(t),\Theta^*)+v \quad (2)$$

with v representing unbiased measurement noise. If the model is identifiable [20]; i.e., $$\hat{y}(t,u(t)|\Theta')\equiv\hat{y}(t,u(t)|\Theta'') \Rightarrow \Theta'=\Theta'' \quad (3)$$

then $$y(t,u(t))\equiv y\hat{y}(t,u(t),\overline{\Theta})+v \Rightarrow \overline{\Theta}=\Theta^* \quad (4)$$

Parameter adaptation becomes necessary when the model parameters $\overline{\Theta}$ are inaccurate, as represented by a nonzero prediction (simulation) error between the measured outputs y(t,u(t)) and model outputs $\hat{y}(t,u(t), \overline{\Theta})$, as $$\epsilon(t)=y(t,u(t)-\hat{y}(t,u(t),\hat{\Theta}) \quad (5)$$

PARSIM, like the gradient-based methods of parameter adaptation, relies on a first-order Taylor series approximation of the measure output y(t) as $$y(t, u(t)) \approx \hat{y}(t, u(t), \hat{\Theta}) + \sum_{i=1}^{Q} \Delta\theta_i \frac{\partial \hat{y}(t, u(t), \Theta)}{\partial \theta_i}\bigg|_{\Theta=\overline{\Theta}} \quad (6)$$

where $\Delta\theta_i=\theta_i^*-\hat{\theta}_i$ denotes the deviation of each parameter from its true value (parametric error) and $\partial\hat{y}(t,u(t),\Theta)/\partial\theta_i$ represents the vector of output sensitivity with respect to parameter $\theta_i$. By substituting (6) into (5), the prediction error can be approximated as the weighted sum of the output sensitivities as $$\varepsilon(t, u(t), \Theta^*, \overline{\Theta}) \approx \Delta\Theta^T \Phi \quad (7)$$

where Φ denotes the matrix of output sensitivities with respect to the model parameters at individual sample points $t_k$:

$$\Phi = \begin{bmatrix} \frac{\partial \hat{y}(t_1,\overline{\Theta})}{\partial \theta_1} & \cdots & \frac{\partial \hat{y}(t_1,\overline{\Theta})}{\partial \theta_Q} \\ \vdots & \ddots & \vdots \\ \frac{\partial \hat{y}(t_N,\overline{\Theta})}{\partial \theta_1} & \cdots & \frac{\partial \hat{y}(t_N,\overline{\Theta})}{\partial \theta_Q} \end{bmatrix} \quad (8)$$

In gradient-based methods, the individual rows of the sensitivity matrix Φ are generally of interest to denote the gradient of the output with respect to individual parameters at each sample point $t_k$. In PARSIM, instead, the individual columns of Φ are considered. Each column is treated as a signal that characterizes the sensitivity of the output to a model parameter during the entire sampled time T. The columns of the sensitivity matrix are called parameter sensitivities in traditional sensitivity analysis, but we refer to them here as parameter effects to emphasize their relation to the outputs, analogous to the models in FIGS. 2A and 2B.

Parameter effects can be obtained empirically (in simulation) by perturbing each parameter to compute its dynamic effect on the prediction error, similar to the strategy used by the experts to obtain the input sensitivities to individual parameters in manual simulation tuning. According to this strategy, parameter effects, $\epsilon_i$, can be defined as:

$$\varepsilon_i(t, u(t), \overline{\Theta}) = \frac{\hat{y}(t, u(t), \overline{\Theta}+\delta\theta_i) - \hat{y}(t, u(t), \overline{\Theta})}{\delta\theta_i} \quad (9)$$

where $\delta\theta_i$ represents a perturbation to parameter $\theta_i$. Given that parameter effects approximate the model output sensitivities to individual parameters:

$$\varepsilon_i(t, u(t), \overline{\Theta}) \approx \frac{\partial \hat{y}(t, u(t), \Theta)}{\partial \theta_i}\bigg|_{\Theta=\overline{\Theta}} \overset{\lim}{=}_{\delta\theta_i\to 0} \quad (10)$$

$$\frac{\hat{y}(t, u(t), \overline{\Theta}+\delta\theta_i) - \hat{y}(t, u(t), \overline{\Theta})}{\delta\theta_i}$$

one can write the prediction error in terms of the parameter effects, as:

$$\varepsilon(t, u(t), \Theta^*, \overline{\Theta}) \approx \sum_{i=1}^{Q} \Delta\theta_i \varepsilon_i(t, u(t), \overline{\Theta}) + v \quad (11)$$

To illustrate the concept of parameter effects and their utility in approximating the prediction error, let us consider the error in the impulse response of the linear mass-spring-damper model:

$$m\frac{d^2x}{dt^2} + c\frac{dx}{dt} + kx = F(t) \quad (12)$$

where x denotes displacement, m its lumped mass, c its damping coefficient, k its spring constant, and F(t) an external excitation force. The prediction error here is caused by the mismatch between the nominal parameters $\overline{\Theta}=[\overline{m},\overline{c},\overline{k}]^T=[340, 10500, 125\times10^3]^T$, responsible for $x(t,\overline{\Theta})$, and the true parameters $\Theta^*=[375, 9800, 130\times10^3]^T$ used to obtain $x(t, \Theta^*)$. The prediction error $\epsilon(t)=x(t)-\overline{x}(t)$ is shown in the top plot of FIG. 3A (solid line) along with its approximation by the weighted sum of the parameter effects (dashed line). Together with this plot, are shown the parameter effects of m, c, and k (FIGS. 3B, 3C and 3D) at several nominal parameter values within 10% of $\overline{\Theta}$. The results indicate close approximation of the error by the weighted sum of parameter effects in FIG. 3A-3D, as well as low sensitivity of the parameter effects to variations in $\overline{\Theta}$.

In a preferred embodiment of the invention, a transformation to the time-scale plane is used to obtain error data. Let $\beta(t)$ be a smoothing function with a fast decay; i.e., any real function $\beta(t)$ that has a nonzero integral and:

$$\forall t \in \Re, |\beta(t)| \leq \frac{C_m}{1+t^m} \quad (13)$$

for some $C_m$ and any decay exponent m. One may consider this smoothing function to be the impulse response of a low-pass filter. An example of such a smoothing function is the Gaussian function. For function $\beta(t)$, $\beta_s(t)$ denotes its dilation by the scale factor s, as:

$$\beta_s(t) = \frac{1}{s}\beta\left(\frac{t}{s}\right) \quad (14)$$

and its convolution with f(t) is represented as:

$$f(t)*\beta(t) = \int_{-\infty}^{\infty} f(t)\beta(t-\tau)d\tau \quad (15)$$

Now if $\psi(t)$ is the nth order derivative of the smoothing function $\beta(t)$; i.e., $$\psi(t) = (-1)^n \frac{d^n(\beta(t))}{dt^n} \quad (16)$$

and has a zero average:

$$\int_{-\infty}^{\infty} \psi(\tau)d\tau = 0 \quad (17)$$

then it is called a wavelet, and its convolution with f(t) is called the wavelet transform $W\{f(t)\}$ of f(t); i.e., $$W\{f(t)\}=f(t)*\phi_s(t) \quad (18)$$

It has been shown that this wavelet transform is a multiscale differential operator of the smoothed function $f(t)*\beta_s(t)$ in the time-scale plane; i.e., $$W\{f(t)\} = s^n \frac{d^n}{dt^n}(f(t)*\beta_s(t)) \quad (19)$$

For instance, the Gauss wavelet which is the first derivative of the Gaussian function will result in a wavelet transform that is the first derivative of the signal f(t) smoothed by the Gaussian function at different scales, and orthogonal to it. Similarly, the Mexican Hat wavelet will produce a wavelet transform that is the second derivative of the smoothed signal in the time-scale plane and the first derivative of the wavelet transform by the Gauss wavelet. As such, the transforms by these wavelets accentuate the differences between the parameter effects, such that one can then isolate regions of the time-scale plane wherein the wavelet transform of a single parameter effect is larger than all the others. At these regions, the prediction error can be attributed to the error of individual parameters and used to separately estimate the contribution of each parameter to the error.

If one considers the above analogy in the time domain, it is synonymous with finding one component $\partial \hat{y}(t_k)/\partial \theta_i$ in the sensitivity matrix $\Phi$ in Chen et al, "Identification of Nonlinear Systems by Haar Wavelet," Proc of IMECE04 Paper No. INECE 2004-62417 (2004), incorporated herein by reference, that can be much larger than all the other components in that row, associated with an individual sample time $t_k$. Even if such a single row with such characteristic could be found, it would be considered just 'lucky'. Yet the present invention provides for identification of such isolated regions can be consistently found within the time-scale plane, for example, using different wavelets for all but mutually nonidentifiable parameters. To illustrate the improved identifiability achieved in time-scale, consider the singular values of the parameter effects of the mass-spring-damper model at a nominal parameter vector. In time domain, the singular values are:

$$[\lambda_{1t}\lambda_{2t}\lambda_{3t}]=[1.8366\ 0.9996\ 0.1638]$$

but in the time-scale plane they vary, depending on the function used for the transformation of the parameter effects. For illustration purposes, the mean of singular values across all scales obtained by the Gaussian smoothing function and the Gauss and Mexican Hat wavelets are shown in Table 1 along with those at the smallest scale.

TABLE 1

The singular values of the transformed parameter effects in the time-scale plane by both the Gaussian function and Gauss and Mexican Hat wavelets.

| Function | Averaged Across Scales $\overline{\lambda}_{iw}$ | | | At the Smallest Scale $\lambda_{iw}$ | | | $\prod_{i=1w}^{3}\overline{\lambda}_{iw}$ | $\overline{\lambda}_{1w}/\overline{\lambda}_{3w}$ |
|---|---|---|---|---|---|---|---|---|
| Gaussian function | 1.9235 | 1.0009 | 0.0756 | 1.845 | 0.9996 | 0.1553 | 0.1455 | 25.4543 |
| Gauss wavelet | 1.6584 | 0.9999 | 0.3417 | 1.1378 | 1 | 0.8621 | 0.5666 | 4.8541 |
| Mexican Hat wavelet | 1.6026 | 0.9994 | 0.398 | 1.2803 | 0.9982 | 0.7215 | 0.6374 | 4.027 |

According to principle component analysis, the more separated the characteristic roots (singular values) are, the more correlated the data; i.e., the parameter effects. As observed from the above singular values, while the sum of each set is the same in both time and time-scale; i.e., $$\sum_{i=1}^{3} \lambda_{it} = \sum_{i=1}^{3} \lambda_{iw} = 3$$

the singular values are considerably more separated in the time domain than those in time-scale obtained by the wavelets. In the time domain, these indices are:

$$\prod_{i=1}^{3} \lambda_{it} = 0.3007 \text{ and } \frac{\lambda_{1t}}{\lambda_{3t}} = 11.2128$$

which are both larger than those obtained with the Gauss and Mexican Hat wavelets, indicating weaker delineation of the parameter effects in time domain than their transformed versions in the time-scale plane by the wavelets. It is reaffirming to also note that the transformed parameter effects by the Gaussian function become more overlapped due to the smoothing effect of the Gaussian function.

A parameter signature is defined here as the union of all pixels in the time-scale plane at which the effect of a single parameter dominates the others in affecting the error. The formal definition of a parameter signature is as follows.

The signature of a parameter is defines as follows: If a pixel $(t_k, S_l)$ exists which satisfies the following condition:

$$W\{\epsilon_i\}(t_k, s_l) >> W\{\epsilon_j\}(t_k, s_l) \forall j=1, \ldots, Q \neq i \quad (20)$$

then it is labeled as $(t_k^i, s_l^i)$ and included in $\Gamma_i$, the signature of parameter $\theta_i$.

The availability of parameter signatures $\Gamma_i$, provides significant transparency to the parameter adaptation problem. It makes possible attributing the wavelet transform of the prediction error:

$$W\left\{\varepsilon\left(t, u(t), \Theta^*, \overline{\Theta}\right)\right\} \approx \sum_{i=1}^{Q} \Delta\theta_i W\left\{\varepsilon_i\left(t, u(t), \overline{\Theta}\right)\right\} + W\{v\} \quad (21)$$

to a single parametric error $\Delta\theta$, for all the pixels $(t_k^i, s_l^i) \in \Gamma_i$, as:

$$W\{\epsilon(t, \Theta^*, \overline{\Theta})\}(t_k^i, s_l^i) \approx \Delta\theta_i W\{\epsilon_i(t, \overline{\Theta})\}(t_k^i, s_l^i) \quad (22)$$

The above equation, which represents one of the Q single-parameter replacement equations to the multi-parameter error equation described by S. Mallat in "A Wavelet tour of Signal Processing," Academic Press, $2^{nd}$ Edition (1999), is a method to decouple the prediction error as a function of individual parameters. Using the above single-parameter approximation of the error over the pixels $(t_k^i, s_l^i) \in \Gamma_i$, one can then obtain the mean estimate of each parametric error as:

$$\Delta\hat{\theta}_i(\overline{\Theta}) \approx \frac{1}{N_i} \sum_{l=1}^{M} \sum_{k=1}^{N} \frac{W\{\epsilon(t, \Theta^*, \overline{\Theta})\}(t_k^i, s_l^i)}{W\{\epsilon_i(t, \overline{\Theta})\}(t_k^i, s_l^i)} \quad (23)$$

where $N_i$ denotes the number of pixels $(t_k^i, s_l^i)$ included in $\Gamma_i$. The above estimate of individual parametric errors then provides the basis for correcting each parametric error separately.

Preferred embodiments of the present invention provide different techniques for extracting the parameter signatures. The simplest technique entails applying a common threshold to the wavelet transform (WT) of each parameter effect $W\{\epsilon_i\}$ across the entire time-scale plane, and then identifying those pixels at which only one $W\{\epsilon_i\}$ is nonzero. The threshold operation takes the form:

$$\overline{W\{\epsilon_i\}} = \begin{cases} 0 & W\{\epsilon_i\}(t_k, s_l) < \eta|\max_{(t,s)} W\{\epsilon_i\}| \\ W\{\epsilon_i\}(t_k, s_l) & \text{otherwise} \end{cases} \quad (24)$$

where $0 < \eta < 1$ is an arbitrary threshold value and $|\max_{(t,s)} W\{\epsilon_i\}|$ denotes the largest absolute wavelet coefficient of the parameter effect. Parameter signature extraction then entails searching in the time-scale plane for those pixels $(t_k^i, s_l^i)$ where only one $\overline{W\{\epsilon_i\}}$ is non-zero. The pixels labeled as $(t_k^i, s_l^i) \in \Gamma_i$, then satisfy the following:

$$|\overline{W\{\epsilon_i\}}(t_k^i, s_l^i)| > 0, \overline{W\{\epsilon_j\}}(t_k^i, s_l^i) = 0 \forall j=1, \ldots, Q \neq i \quad (25)$$

which is synonymous with:

$$|W\{\epsilon_i\}(t_k^i, s_l^i)| > \eta \max_{(t,s)} W\{\epsilon_i\},$$

$$|W\{\epsilon_j\}(t_k^i, s_l^i)| < \eta|\max_{(t,s)} W\{\epsilon_j\}|, \quad (26)$$

$$\forall j = 1, \ldots, Q \neq i$$

By comparing (26) to (20), one can see that the proposed signature extraction technique does not necessarily ensure that every pixel $(t_k^i, s_l^i)$ will satisfy (20), because it is always possible that for some small $\epsilon_j > 0$:

$$|W\{\epsilon_i\}(t_k^i, s_l^i)| + \epsilon_i > \eta \max_{(t,s)} W\{\epsilon_i\},$$

$$|W\{\epsilon_j\}(t_k^i, s_l^i)| - \epsilon_i < \eta|\max_{(t,s)} W\{\epsilon_j\}|$$

$$\forall j = 1, \ldots, Q \neq i$$

It is shown below that the more dissimilar the parameters effects are, the more likely it is to approximate the parameter signatures by the above thresholding technique.

Figure 4C:
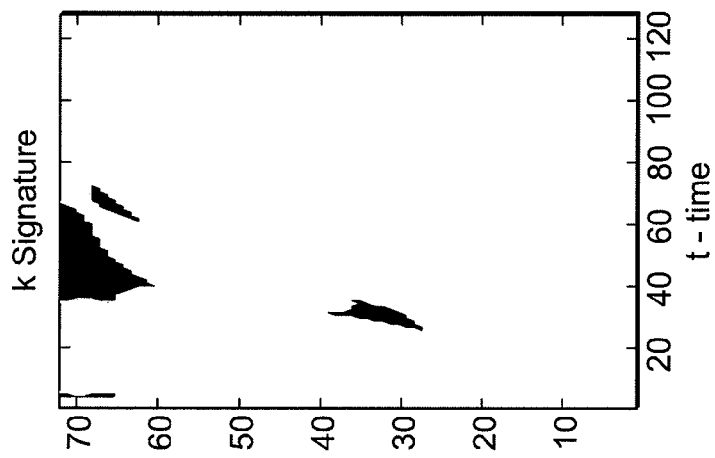
FIGS. 4A-4C show the parameter signatures of m, c and k of the mass-spring-damper model by Gauss WT, respectively.
Figure 4B:
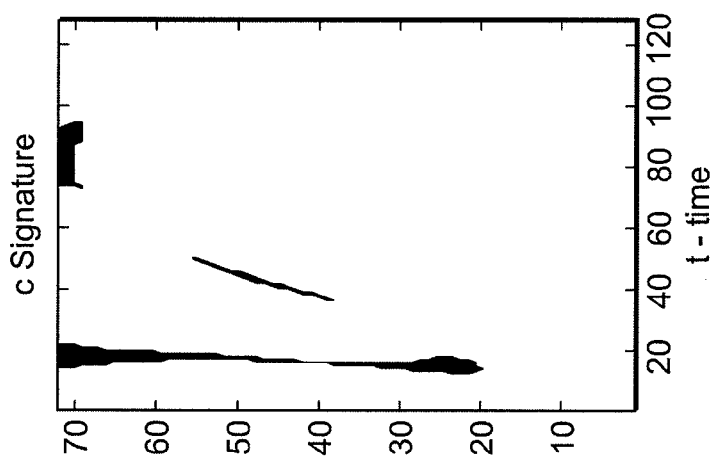
Figure 4A:
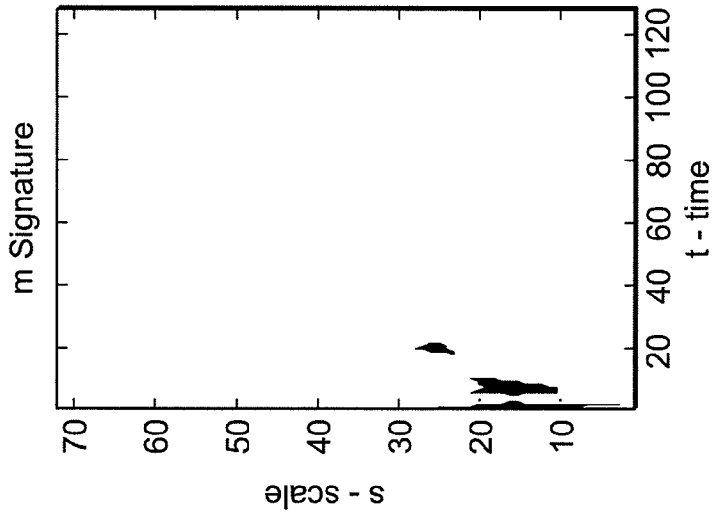

The effectiveness of the above parameter signature approximation strategy can be demonstrated in the context of the prediction error of FIGS. 3A-3D. The parameter signatures obtained from the Gauss WT of the parameter effects with a threshold value of $\eta = 0.2$ are shown in FIGS. 4A-4C. Based on these signatures, the average estimate of parametric errors obtained are:

$$\Delta\hat{\Theta} = [\Delta\hat{m}, \Delta\hat{c}, \Delta\hat{k}] = [30, -759, 5962] \text{ vs } \Delta\Theta = [\Delta m, \Delta c, \Delta k] = [35, -700, 5000] \quad (27)$$

which compare favorably together.

Before proceeding to parameter adaptation, consider the conditions for signature extraction. In general, the uniqueness of the parameter signatures adaptation solution resulting from the parameter signatures is bound by the posterior identifiability of the model which is dependent on the input conditions and noise, in addition to structural identifiability of the model. But the above strategy of isolating pixels at which the contribution to the prediction error of a single parameter is dominant depends, by and large, on the dissimilarity of the pairs of parameter effects. This is defined in terms of mutual identifiability of model parameters. Specifically, if $\delta\theta_i$ and $\delta\theta_j$ denote perturbations to the two mutually identifiable parameters $\theta_i$ and $\theta_j$, respectively, then according to (3), the following must be true:

$$\forall \delta\theta_i \text{ and } \delta\theta_j \neq 0 \implies \hat{y}(t|\overline{\Theta}+\delta\theta_i) \neq \hat{y}(t|\overline{\Theta}+\delta\theta_j)$$

Mutual identifiability is analytically tractable for linear models and empirically assessable for nonlinear models with various input conditions. Furthermore, it can be evaluated in the timescale domain. The important feature of mutual identifiability (m.i.) is that it can be assessed through the correlation of parameter effects, as stated in the following proposition.

It is known that given input u(t), two parameters $\theta_i$ and $\theta_j$ are mutually identifiable if and only if their parameter effects $\epsilon_i(t)$ and $\epsilon_j(t)$ are not collinear; i.e., $$\theta_i \text{ and } \theta_j \text{ m.i.} \implies \epsilon_i(t) \neq \alpha \epsilon_j(t) \forall \alpha \in \mathfrak{R} \quad (28)$$

According to the above, mutual identifiablility only ensures pairwise linear independence of the columns of the sensitivity matrix $\Phi$. As such, it is only a necessary condition for posterior identifiability which requires that the sensitivity matrix $\Phi$ be full column rank.

The extension of these results to parameter signature extraction becomes clear when one considers the WT of the parameter effects of two mutually nonidentifiable parameters $\theta_i$ and $\theta_j$. According to the above theorem, the parameter effects of two mutually nonidentifiable (m.n.i.) parameters $\theta_i$ and $\theta_j$ are collinear; i.e., $$\theta_i \text{ and } \theta_j \text{ m.i.}$$

Therefore, the threshold operation in equation (24) will result in identical nonzero regions for $\overline{W\{\epsilon_i\}}$ and $\overline{W\{\epsilon_j\}}$, thus making it impossible to extract unique signatures for either of the two parameters according to equation (25). Consequently, parameter signatures cannot be extracted for two mutually nonidentifiable parameters.

Figures 5A, 5B, 5C:
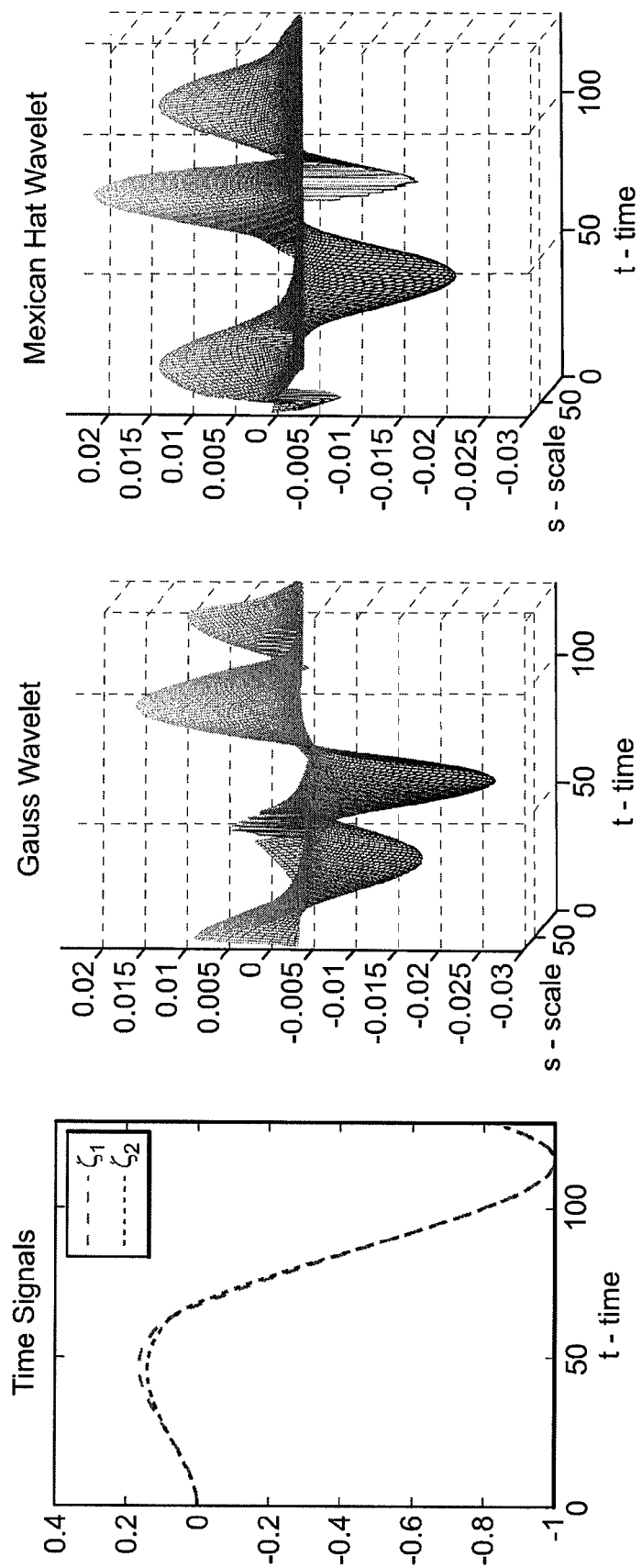
FIGS. 5A-5C show two nearly correlated signals and the difference between the absolute values of their transforms in the time-scale domain.
Figures 6A, 6B, 6C:
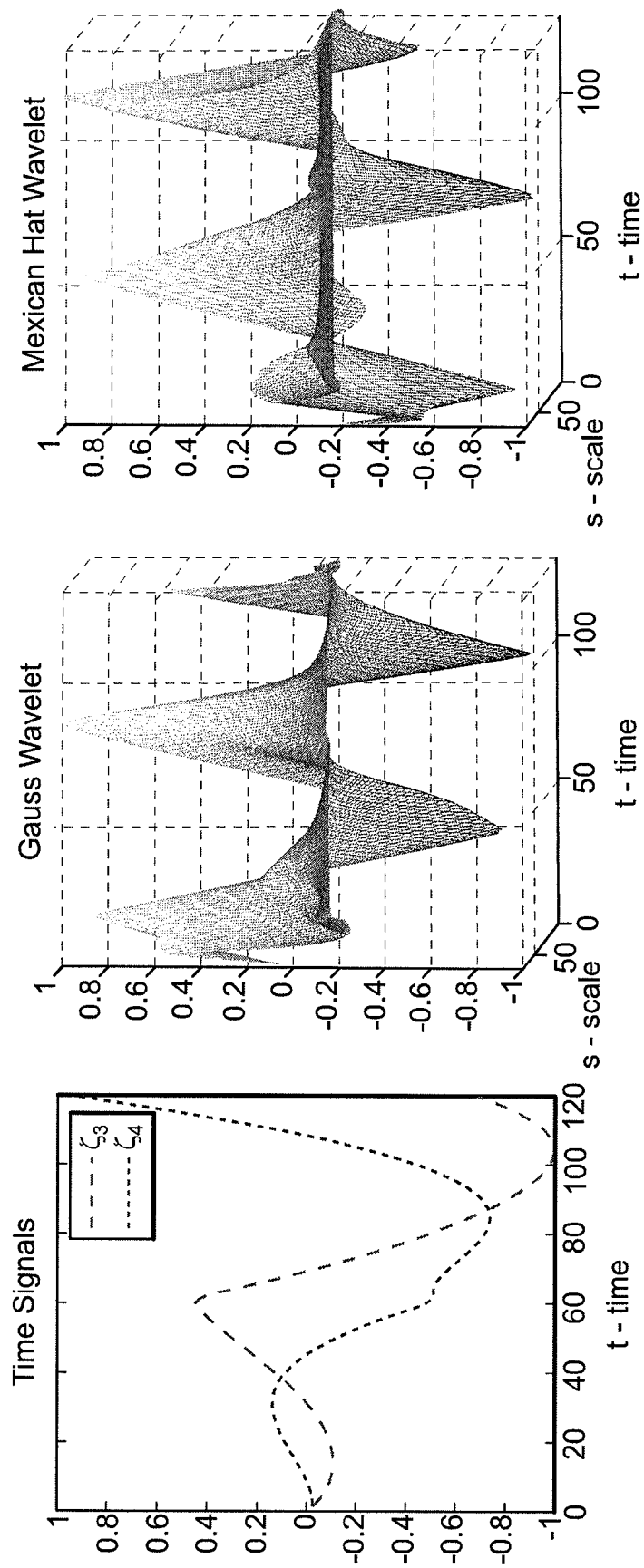
FIGS. 6A-6C show two uncorrelated signals and the difference between the absolute values of their transforms in the time-scale domain.
Figure 7B:
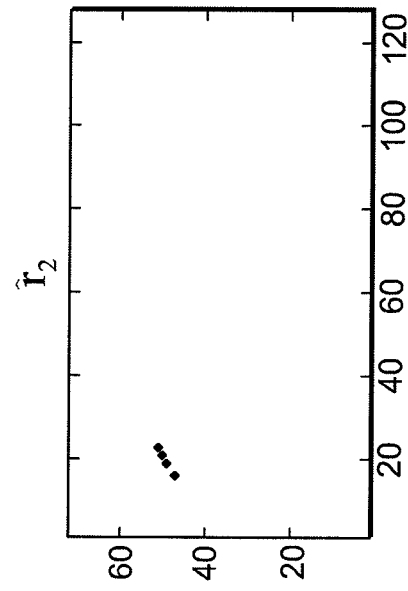
FIGS. 7A-7D show two uncorrelated signals (7A, 7B) and the difference between the absolute values of their transforms in the time-scale domain (7C, 7D)
Figure 7D:
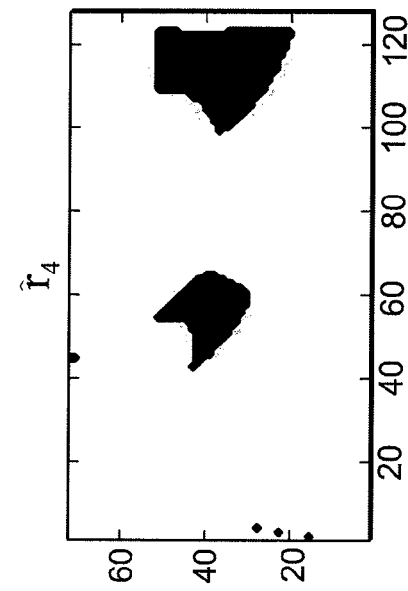
Figure 7A:
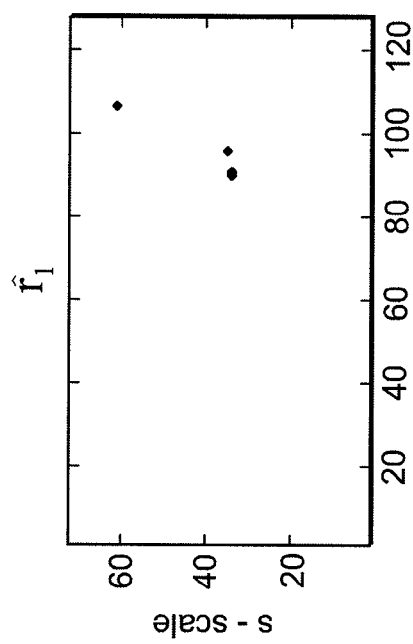
Figure 7C:
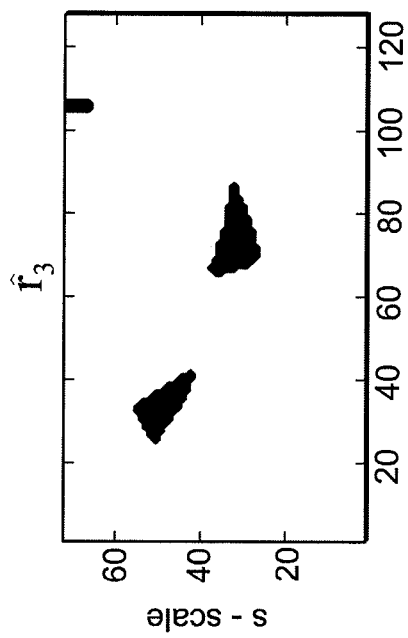

Mutual identifiability is also a sufficient condition for approximating parameter signatures by thresholding. To substantiate this, consider the two signals $\varsigma_1$ and $\varsigma_2$ in FIG. 5A to represent the hypothetical parameter effects of two parameters $\theta_1$ and $\theta_2$. These two signals are nearly collinear with a correlation coefficient of 0.9997. Yet when the difference between their absolute normalized wavelet transforms is considered, $|W\{\varsigma_1\}|/\max|W\{\varsigma_1\}|-|W\{\varsigma_2\}|/\max|W\{\varsigma_2\}|$, shown in FIGS. 5B and 5C for both the Gauss and Mexican Hat wavelets, one observes that there are both positive and negative wavelet coefficients. This indicates that for each signal, there are regions of the time-scale plane where each signal's wavelet coefficient exceeds the other's, albeit by a small margin. As such, some threshold q can be found that satisfies (26). It is also clear that because of the small difference margins between the wavelet coefficients in each case, the approximation of the parameter signatures of $\theta_1$ and $\theta_2$ by thresholding can be quite poor, hence, resulting in unreliable parametric error estimates. One can extrapolate these results to multiple signals, with the expectation that the regions included in each parameter's signature will become smaller as the other signals' wavelet coefficients will overlap its wavelet coefficients. In contrast to the signals in FIGS. 5A-5C, examine the two uncorrelated signals $\varsigma_3$ and $\varsigma_4$ with the correlation coefficient of 0.0772 in FIGS. 6A-6C, associated with the parameters $\theta_3$ and $\theta_4$. While one can observe that the trend of positive and negative values exists for $|W\{\varsigma_3\}|/\max|W\{\varsigma_3\}|-|W\{\varsigma_4\}|/\max|W\{\varsigma_4\}|$ as well, one can also note that the difference margins between the wavelet coefficients are now much larger. This makes it possible to isolate regions where $W\{\epsilon_3\}(t_k,s_l) \gg W\{\epsilon_4\}(t_k,s_l)$ as well as those where $W\{\epsilon_4\}(t_k,s_l) \gg W\{\epsilon_j\}(t_k,s_l)$, hence providing a much more accurate approximation of the signatures.

To illustrate the influence of correlation between the parameter effects on the quality of approximated signatures, the estimated signatures of the four parameters $\theta_1$ to $\theta_4$ with the Gauss wavelet transform of the signals $\varsigma_1$ to $\varsigma_4$ using a threshold level of $\eta=0.1$ are shown in FIGS. 7A-7D. The signatures $\hat{\Gamma}_1$ and $\hat{\Gamma}_2$ are clearly more sparse than $\hat{\Gamma}_3$ and $\hat{\Gamma}_4$, reflecting the difficulty of signature extraction for closely correlated $\varsigma_1$ and $\varsigma_2$.

In image processing, it is generally known that the 'edges' represent the most distinguishable aspect of images and are used extensively for data condensation. Furthermore, edges of the WT represent the local time-signal irregularities which characterize the transient features of dynamic systems and distinguish them from each other.

Edges are detected in the time-scale domain by the modulus maxima of the WT which are good indicators of decay of the WT amplitude across scales. Following the definition by Mallat, a modulus maximum at any point of the time-scale plane $(t_0, s_0)$ is a local maximum of $|W\{f(t,s_0)\}|$ at $t=t_0$. This implies that at a modulus maximum:

$$\frac{\partial W\{f(t_0, S_0)\}}{\partial t} = 0$$

and the maxima lines are the connected curves s(t) in the time-scale plane (t,s) along which all points are modulus maxima.

There is support indicating that the WT modulus maxima captures the content of the (at least 80% or 90%??) image, and that signals can be substantially reconstructed based on the WT modulus maxima. In fact, Mallat and Zhong report that "according to numerical experiments, one can obtain signal approximations with a relative mean-square error of the order of $10^{-2}$ and that is because fast numerical computation of modulus maxima is limited to dyadic scales $\{2^j\}j \in z$ which seems to be the limiting factor in the reconstruction of the signal." But a good indication of the effectiveness of WT modulus maxima in capturing the main aspects of an image is that signals with the same WT modulus maxima differ from each other by small variations in the data. Although Meyer has shown that the WT modulus maxima do not provide a complete signal representation, the functions that were characterized by the same WT modulus maxima, to disprove true representation, only differed at high frequencies, with their relative $L^2$ (R) distance being of the same order as the precision of the dyadic reconstruction algorithm.

Figure 8B:
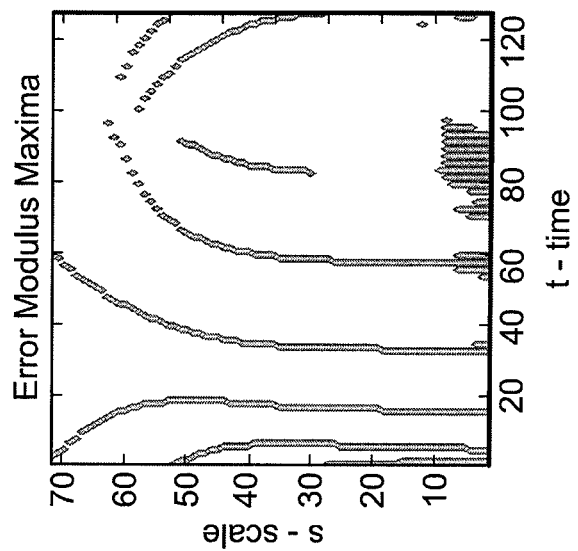
FIGS. 8A and 8B show the Gauss WT of the impulse response error of the mass-spring-damper model (8A) and its modulus maxima (8B)
Figure 8A:
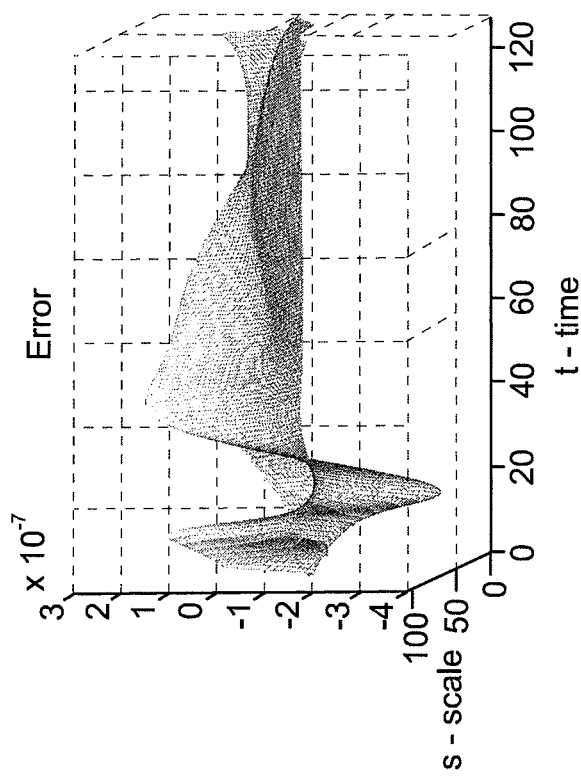
Figure 9A:
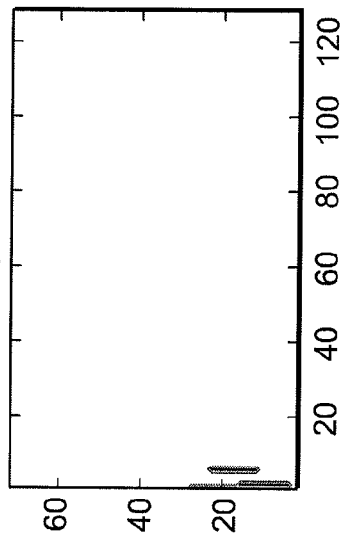
FIGS. 9A-9D show the Gauss WT modulus maxima of the impulse response prediction error of the mass-spring-damper model and the parameter signatures of m, c and k at the error edges.
Figure 9B:
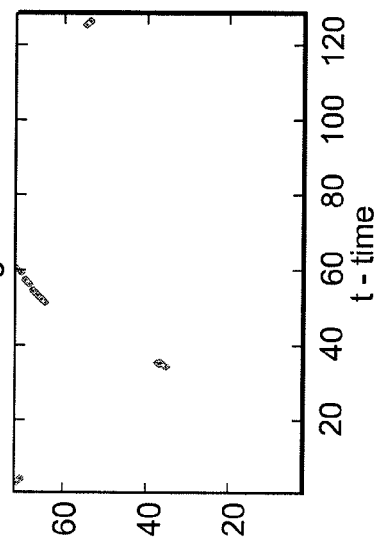
Figure 9C:
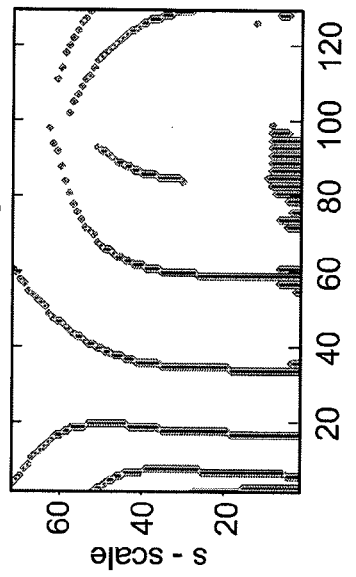
Figure 9D:
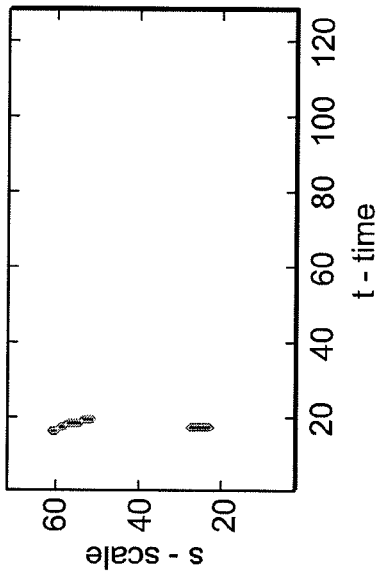

Given that the WT modulus maxima successfully represent the signal's image in the time-scale domain and can be effectively used for signal reconstruction, the question arises as whether they represent the data content of the time signal as well. As a test, use the modulus maxima of the WT of the error to estimate the parameters of the mass-spring-damper model of Eq. 12. Shown in FIGS. 8A-8B are the Gauss WT of the error (8A) and the contours of its WT modulus maxima (8B). Specifically, the least-squares estimates of the parameters were obtained as:

$$\hat{\Gamma} = \bar{\Gamma} + (\Phi^T \Phi)^{-1} \Phi^T \zeta \qquad (29)$$

which for time-based estimation:

$$\zeta = \epsilon(t), \Phi = [\epsilon_1(t), \epsilon_2(t), \epsilon_3(t)] \qquad (30)$$

and for estimation according to the WT modulus maxima:

$$\varsigma = MM\{W\{\epsilon(t)\}\} \odot W\{\epsilon(t)\}, \qquad (31)$$
$$\Phi = [MM\{W\{\epsilon(t)\}\} \odot W\{\epsilon_i(t)\}] i = 1, 2, 3$$

where MM denotes modulus maxima and $\odot$ represents pixel to pixel multiplication. It should be noted that the WT modulus maxima MM{W} is a binary matrix of ones and zeros, having the value of one at the pixels where the maxima occur and 0 elsewhere. Therefore, to only consider the wavelet coefficients at the edges of the WT of the error (hereafter referred to as error edges), $\zeta(t,s)$ is obtained from pixel to pixel multiplication of the binary WT modulus maxima of the error by the corresponding wavelet coefficients of the error. The logic here is that if indeed the error edges adequately characterize the signal's image in the time-scale domain, then they ought to represent the data content of the time signal as well. To be consistent with Eq. 21, matrix $\Phi$ in Eq. 31 is defined to comprise the WT of the parameter effects at the same pixels as $\zeta(t,s)$.

The least-squares estimates of m, c and k according to the time data, the entire time-scale data, and the wavelet coefficients at the error edges are shown in Table 2. The results indicate that the estimates obtained from the error edges are even slightly more precise than those obtained from the time or the entire time-scale data. This validates the hunch that the local time-signal irregularities used by the experts contain important features of the error signal. It also gives credence to seeking parameter signatures at the edges of the prediction error as the means to characterize signal irregularities in the time-scale domain.

TABLE 2

Least-squares parameter estimates of the linear mass-spring-damper model with $\Theta^* = [375, 9800, 130 \times 10^3]^T$.

| Data Base | Parameter Estimates | | | Precision Error $(10^{-5})$ $\sum_{i=1}^{3}((\theta_i^* - \hat{\theta}_i)/\theta_i^*)^2$ |
|---|---|---|---|---|
| | $\hat{m}$ | $\hat{c}$ | $\hat{k}$ | |
| Time Data ($\epsilon(t)$) | 377 | 9784 | $130 \times 10^3$ | 4.23 |
| Time-Frequency Data ($W\{\epsilon(t)\}$) | 377 | 9787 | $130 \times 10^3$ | 2.80 |
| WT Modulus Maxima ($M\{W\{\epsilon(t)\}\}$) | 375 | 9765 | $130 \times 10^3$ | 1.66 |

Having been convinced of the fidelity of data content at the error edges, the parameter signatures of the mass-spring-damper model can be re-extracted to only include the pixels at the error edges. The contour plot of the error edges of the mass-spring-damper model in Eq. 12 using the Gauss wavelet are shown in FIGS. 9A-9D along with the edge signatures of m, c, and k. Using these signatures, the average estimate of parametric errors are:

$$\overline{\Delta\Theta} = [\overline{\Delta m, \Delta c, \Delta k}]^T = [30, -897, 6645]^T \text{ vs } \Delta\Theta = [\Delta m, \Delta c, \Delta k]^T = [35, -700, 5000]^T$$

which are in general agreement.

The parametric error estimates are not exact for several reasons:

1. The extracted parameter signatures $\hat{\Gamma}$, are only approximations to the ideal signatures $\Gamma_1$, thus ignore the effects of other parameters at individual pixels.
2. The parameters are estimated by relying solely on the first-order Taylor series approximation of the prediction error and ignoring measurement noise.
3. The parameter signatures depend on the nominal parameter vector $\overline{\Theta}$.

As such, adaptation of parameters based on the parametric error estimates needs to be conducted iteratively, so as to incrementally reduce the error in $\overline{\Theta}$.

Following the general form of adaptation in Newton methods, parameter adaptation in PARSIM takes the form:

$$\hat{\theta}_i(k+1) = \hat{\theta}_i(k) + \mu \Delta \hat{\theta}_i(k) \qquad (32)$$

where $\Delta \hat{\theta}_i$ is estimated and $\mu$ is the iteration step to account for the inaccuracy of parametric error estimates. The logic of PARSIM's adaptation can best be understood in comparison to the Newton-Raphson method applied to a single parameter model having the form:

$$\hat{\theta}_i(k+1) = \hat{\theta}_i(k) + \mu \frac{\varepsilon(t_k)}{\partial \hat{y}(t_k) / \partial \theta_i} \qquad (33)$$

By comparing the two adaptation algorithms, one can observe that PARSIM is the implementation of the Newton-Raphson method in the time-scale domain. In the Newton-Raphson method, the parametric error estimate $\epsilon(t_k)/(\partial \hat{y}(t_k)/\partial \theta_i)$ is the ratio of the error to the output's derivative with respect to the parameter. In PARSIM, $\Delta \hat{\theta}_i$ is the mean of the WT of this same ratio at the pixels included in each parameter's signature.

Consider now the evaluation of PARSIM's performance in adaptation. As a benchmark, PARSIM's performance is compared with that of the Gauss-Newton method which is a mainstream yet effective regression method. The Gauss-Newton method used in this study has the form:

$$\hat{\Theta}(k+1) = \hat{\Theta}(k) + \mu \Delta \hat{\Theta}(k) \qquad (34)$$

where $\Delta \hat{\Theta}$ is obtained with $\zeta$ and $\Phi$ defined as in Walter et al, "on the Identifiability of Nonlinear Parametric Models" Mathematics and Computers in simulation, Vol. 42, pp. 125-134 (1996), the entire contents of which is incorporated herein by reference.

As a measurement of PARSIM's performance, it was applied to the adaptation of the mass-spring-damper model parameters. Adaptation was performed with one hundred random initial parameter values within 25% of $\Theta^*$. A step size of $\mu=0.25$ was used for both PARSIM and the Gauss-Newton method with a threshold level of $\eta=0.20$. The mean values of the parameter estimates after 25 iterations of PARSIM and the Gauss-Newton method are listed in Table 3. Along with the estimates are the mean values of the precision error $\epsilon_\Theta$ computed as:

$$\epsilon_\Theta = \sum_{i=1}^{3} \left( (\theta_i^* - \hat{\theta}_i)/\theta_i^* \right)^2 \quad (35)$$

Figures 10A, 10B, 10C:
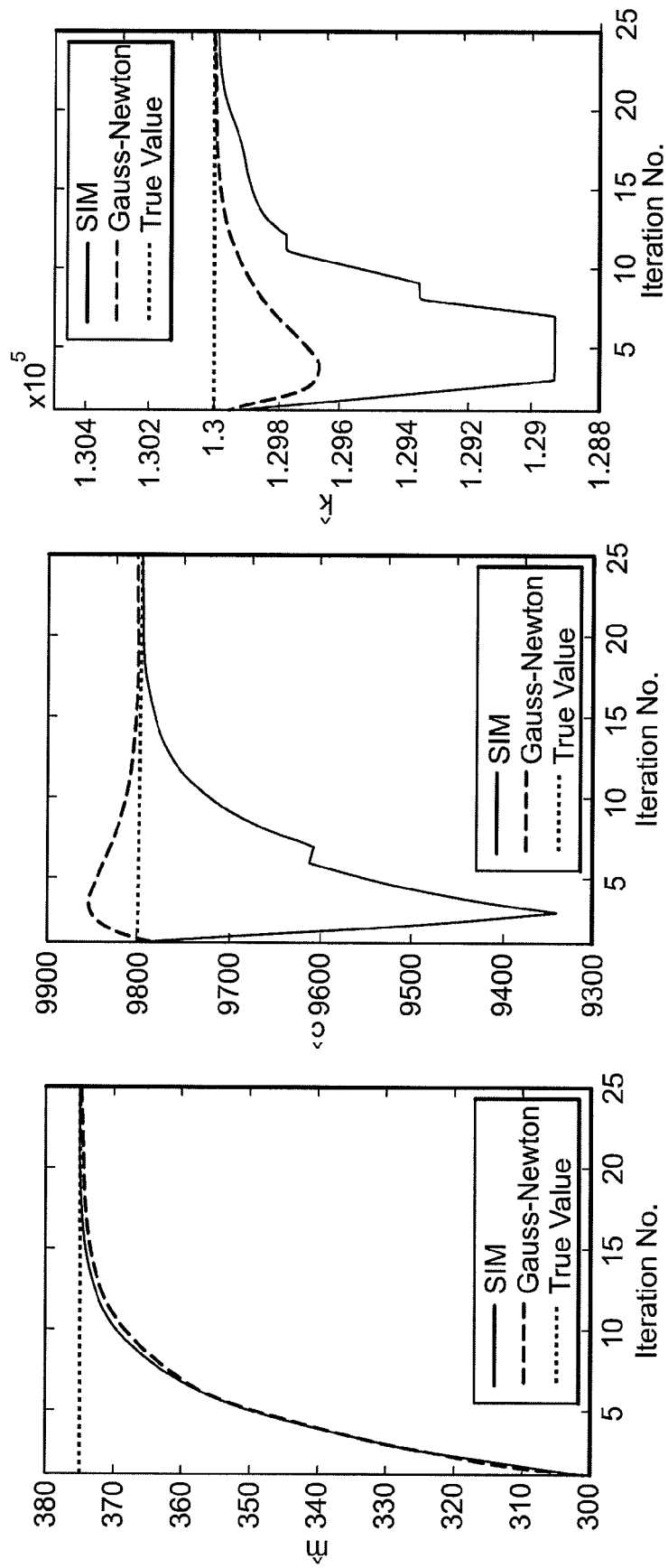
FIGS. 10A-10C show the parameter estimates for M, C and K, respectively, during adaptation by PARSIM and the Gauss-Newton method of the mass-spring-damper model when only one of the parameters is erroneous.

They indicate that PARSIM provides nearly as precise an adaptation as the Gauss-Newton method. Note that PARSIM does not necessarily adjust only the erroneous parameters during adaptation. The reason is the dependence of the parameter signatures on the nominal parameter vector $\overline{\Theta}$. To illustrate this point, consider adapting the parameters of the mass-spring-damper model when only one of the parameters is erroneous, as in $\overline{\Theta}=[300, 9800, 130 \times 10^3]$ that corresponds to $\Delta\Theta=[75,0,0]$. The parametric error estimates using the Gauss WT and a threshold value of $\eta=0.2$ are $\Delta\hat{\Theta}=[64,-1194,-2311]$, which provide a close estimation of only the first parametric error. Note that the estimated parametric error above results in a reduced precision error of 0.0257 from its initial value of 0.04. The adapted parameters from this adaptation run of PARSIM are shown in FIGS. 10A-10C, which indicate that the disturbed parameters c and k from their correct values converge to their true values in the subsequent adaptation iterations of PARSIM. Along with PARSIM's estimates in this figure are those by the Gauss-Newton method which exhibit a similar trend, albeit less drastic.

Figure 11B:
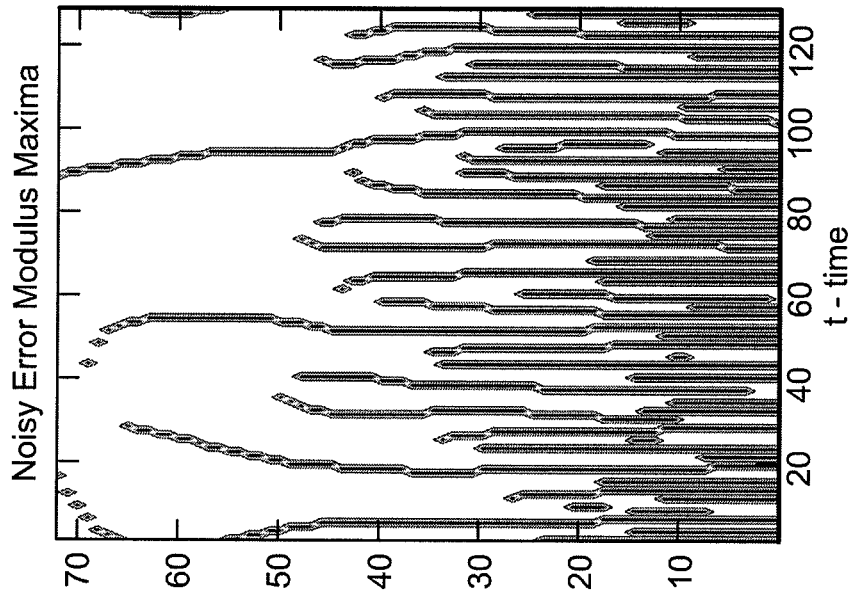
FIGS. 11A and 11B show Gauss error edges of the mass-spring-damper model associated with a noise-free output (11A) and a noise contaminated output (11B)
Figure 11A:
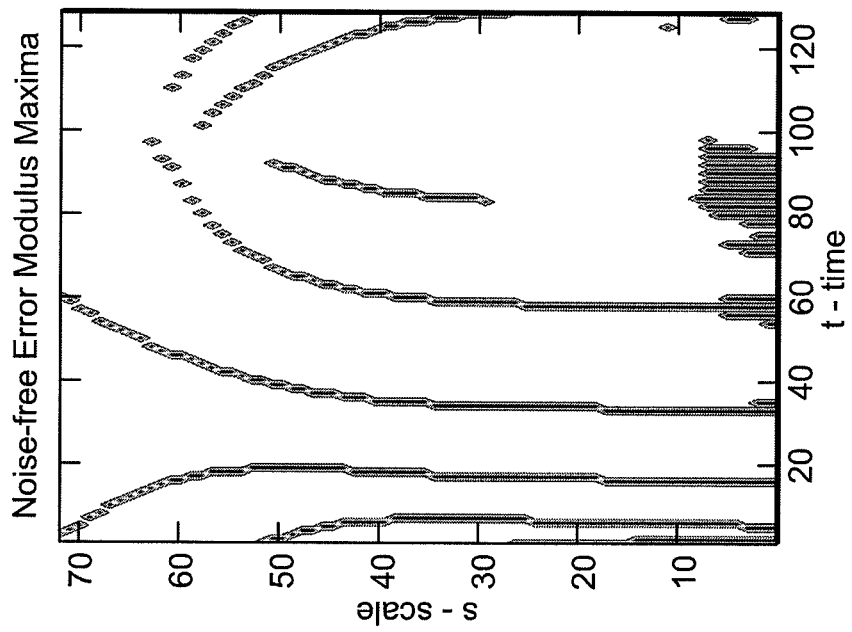

The comparable adaptation results of PARSIM to the Gauss-Newton method confirm the basic validity of its parametric error minimization strategy by PARSIM. To further evaluate its efficacy, PARSIM is next applied to noisy outputs with the objective of taking advantage of the transparency afforded by the parameter signatures. For this, one can explore the vast body of noise-rejection and compensation techniques available in the time-frequency domain to develop an elaborate solution for PARSIM. Here we suffice to a simple approach of identifying and separating the regions affected by noise, to only illustrate the basic advantage of access to the time-scale plane. For illustration purposes, noise was added to the output of the mass-spring-damper model. The error edges of the noise-free case, compared with those of the new error in FIGS. 11A and 11B, indicate significant distortion in the error edges due to noise, as well as many more edges at the finer scales of the time-scale plane. This suggests that by removing the noise-related pixels from those included in the parameter signatures one may be able to improve the adaptation results, although it will be difficult to completely account for the distortion of the error wavelet coefficients in every region.

TABLE 3

Twenty fifth-iteration mean of the adapted mass-spring-damper model parameters from one hundred adaptation runs of PARSIM and the Gauss-Newton method. Random initial parameter values were used for each adaptation run within 25% of the true values.

| True Parameter Value | Parameter Estimates | | | |
|---|---|---|---|---|
| | PARSIM | | Gauss-Newton | |
| | Mean | St. Dev. | Mean | St. Dev. |
| m = 375 | 375 | 0.1013 | 375 | 0.0205 |
| c = 9800 | 9800 | 1.3410 | 9800 | 0.5000 |
| k = 130 × 10³ | 130 × 10³ | 11.9476 | 130 × 10³ | 6.6988 |
| Precision Error | $9.9748 \times 10^{-8}$ | | $8.2655 \times 10^{-9}$ | |

Figures 12A, 12B, 12C:
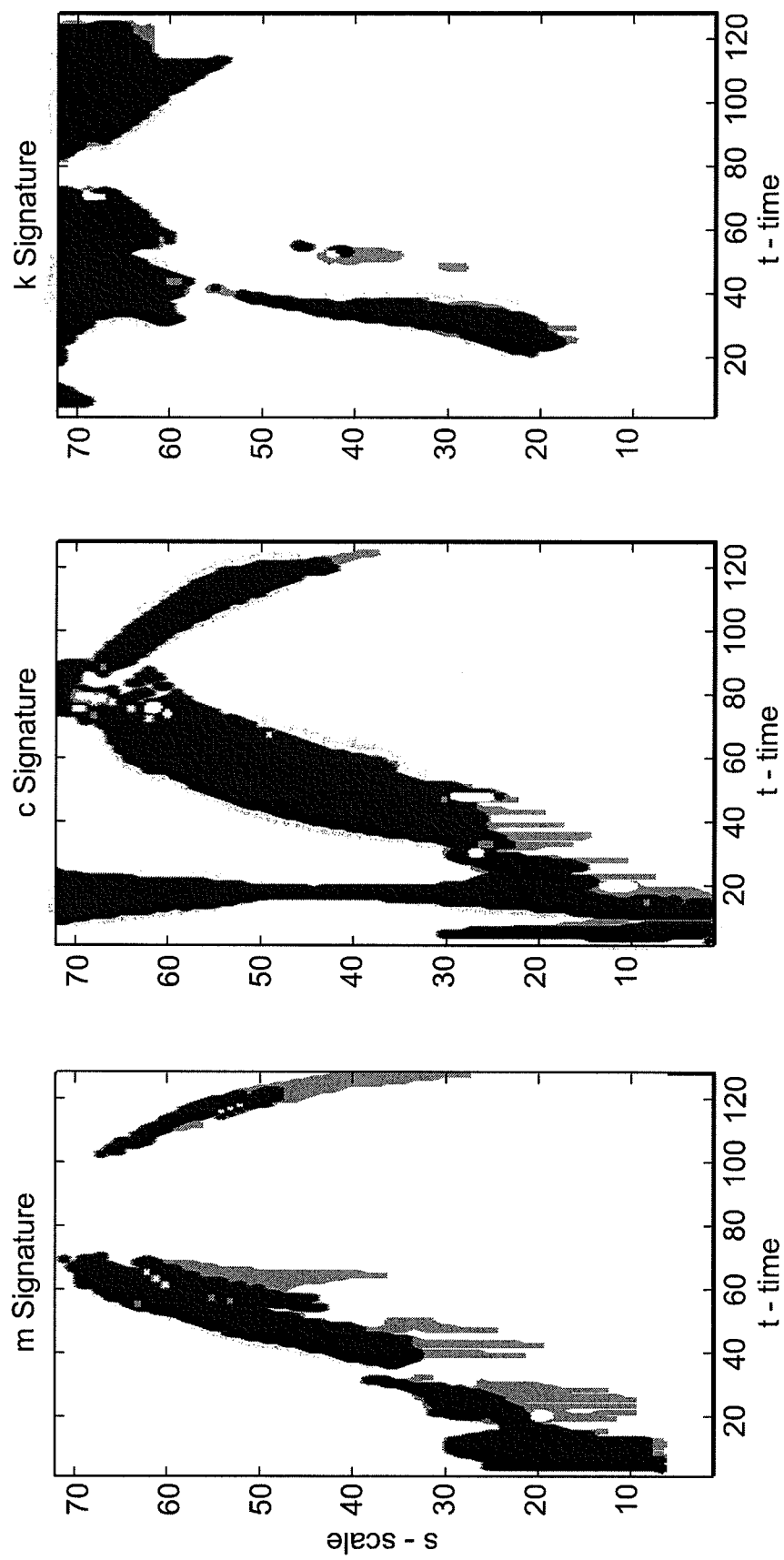
FIGS. 12A-12C illustrate the separation between noise related regions of the time-scale plane and the parameter signatures at the error edges of the mass spring damper model for M, C and K, respectively.
Figure 13:
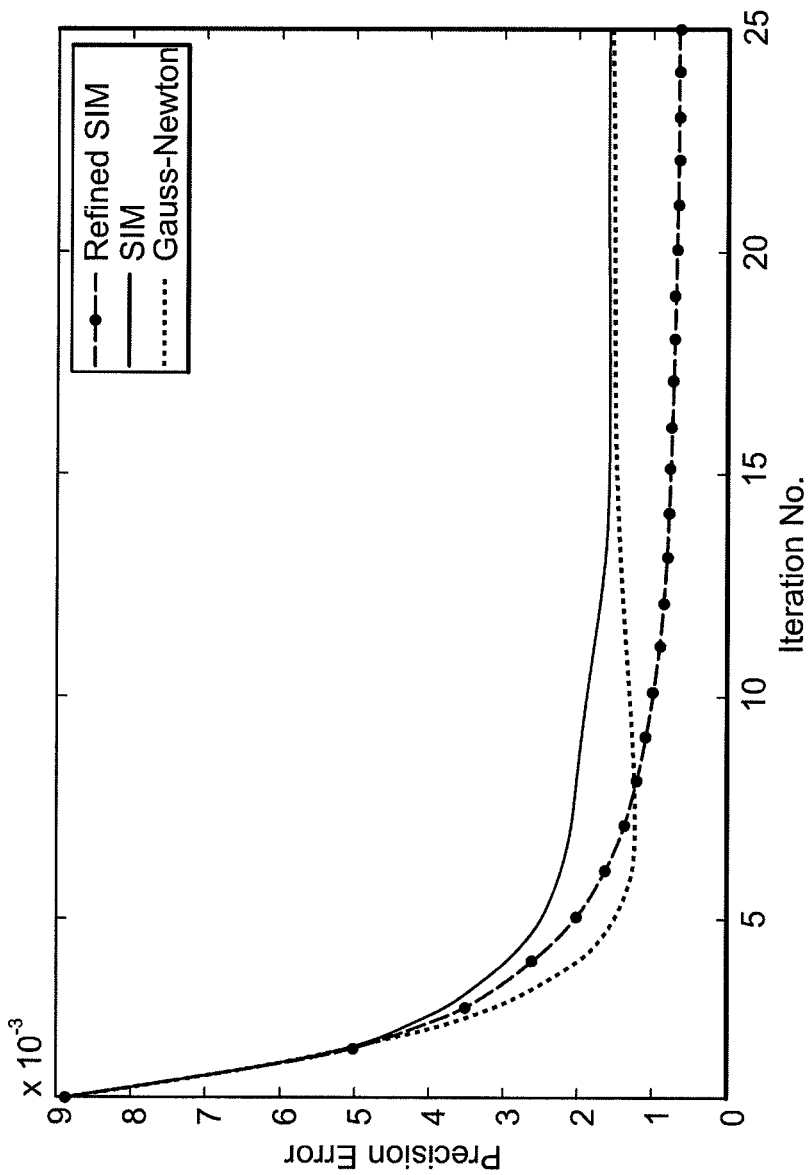
FIG. 13 graphically illustrates the mean value of the precision error corresponding to the results of Table 4.

To evaluate the exclusion strategy described above, the regions of the time-scale plane included in 5000 parameter signature samples of the mass-spring-damper model at random nominal parameter values $\overline{\Theta}$, within 25% of $\Theta^*$, were used as reference. These regions are shown in FIGS. 12A, 12B and 12C together with their counterparts obtained with the noise-contaminated output. The results show specific regions of the time-scale plane affected purely by noise, which can be excluded from the parameter signatures when estimating the parametric errors during parameter adaptation. The mean and standard deviation of the adapted parameters from one hundred adaptation trials of PARSIM, obtained with and without the noise-related regions, and by the Gauss-Newton method, are shown in Table 3 along with the mean of the precision errors by the two methods. The results indicate that by excluding the noise-affected regions from the parameter signatures, the precision of the adapted parameters improves. But a more telling aspect of the adaptation results is evident from the magnitude of the precision error shown in FIG. 13 for both PARSIM and the Gauss-Newton method. According to this figure, the precision error by the Gauss-Newton method does reach lower levels in the midst of adaptation, but it is passed up in favor of a lower prediction error which is the objective of adaptation by the Gauss-Newton method. PARSIM, on the other hand, focuses on individual parametric error corrections, so it continually reduces the precision error during adaptation as indicated by the corresponding precision error in FIG. 13.

TABLE 4

Twenty fifth-iteration mean and standard deviation values of the adapted mass-spring-damper model parameters obtained with the noise-contaminated regions (denoted as PARSIM) and without them (denoted as Refined PARSIM). One hundred adaptation runs were performed with random initial parameter values within 25% of the true values. For comparison, also included are the results of the Gauss-Newton method for the same initial parameter values.

| True Parameter Value | Parameter Estimates | | | | | |
|---|---|---|---|---|---|---|
| | PARSIM | | Refined PARSIM | | Gauss-Newton | |
| | Mean | St. Dev. | Mean | St. Dev. | Mean | St. Dev. |
| m = 375 | 386.67 | 5.77 | 377.41 | 5.91 | 388.54 | 0.02 |
| c = 9800 | 9618.9 | 47.35 | 9622.0 | 36.07 | 9795.4 | 0.53 |
| k = 130 × 10³ | 130.48 × 10⁻³ | 414.84 | 129.67 × 10⁻³ | 438.71 | 131.87 × 10⁻³ | 7.13 |
| Precision Error | 0.0016 | | $6.4846 \times 10^{-4}$ | | 0.0015 | |

Another potential advantage of PARSIM is in adaptation of poorly excited models. A common requirement in system identification is the richness (persistent excitation) of inputs. Persistent excitation (pe), which is necessary for exciting the modes of the system, ensures the availability of adequate equations for the unknowns (parameters) in regression-based estimation. But the results in Table 3 by both PARSIM and the Gauss-Newton method indicate that effective adaptation can be achieved with a non-pe input such as an impulse. The explanation to this seemingly counter-intuitive point is provided by Söderström and Stoica as: "The condition of persistent excitation (pe) is important only in noisy systems. For noise-free systems, it is not necessary that the input be pe. Consider for example, an nth order linear system initially at rest. Assume that an impulse is applied, and the impulse response is recorded. From the first 2n (nonzero) values of the signal it is possible to find the system parameters. The reason is that noise-free systems can be identified from a finite number of data points ($N < \infty$) whereas pe concerns the input properties for $N \to \infty$ (which are relevant to the analysis of the consistency of the parameter estimates in noisy systems). For systems with a large signal-to-noise ratio, an input step can give valuable information about the dynamics. Rise time, overshoot and static gain are directly related to the step response. Also, the major time constants and a possible resonance can be at least crudely estimated from a step response."

To measure the performance of PARSIM in the absence of persistent excitation, the free responses of two (linear and nonlinear) mass-spring-damper models were simulated to an initial displacement of $x(0)=0.2$. The linear model is that in Leontartitis et al., "Input-Output Parametric Models for Nonlinear Systems," Int. J. of control, Vol. 41, No. 2, pp. 303-344 (1985), the entire contents of which is incorporated herein by reference, the nonlinear model has the form:

$$m\ddot{x}(t) + c|\dot{x}(t)|\dot{x}(t) + kx^3(t) = 0 \qquad (36)$$

having the same parameter values as the linear model. The mean and standard deviation of the adapted parameters from one hundred adaptation runs of PARSIM and the Gauss-Newton method using random initial parameter values, within 25% of the actual parameter vector $\Theta^*$, are shown in Table 5. The results indicate that the adapted parameters by PARSIM are considerably more accurate than those by the Gauss-Newton method, having smaller standard deviations as well. These results, albeit anecdotal, indicate the more robust nature of the parametric error minimization strategy use by PARSIM.

TABLE 5

Twentieth-iteration mean and standard deviation values of adapted linear and nonlinear mass-spring-damper models parameters obtained with poor excitation. One hundred adaptation runs were performed by both PARSIM and the Gauss-Newton method with random initial parameter values within 25% of the true values.

| True Parameter Values | Linear mass-spring-damper | | | | Nonlinear mass-spring-damper | | | |
| --- | --- | --- | --- | --- | --- | --- | --- | --- |
| | PARSIM | | Gauss-Newton | | PARSIM | | Gauss-Newton | |
| | Mean | St. Dev. | Mean | St. Dev. | Mean | St. Dev. | Mean | St. Dev. |
| m = 375 | 374 | 13 | 394 | 45 | 374 | 13 | 437 | 80 |
| c = 9800 | 9776 | 339 | 10300 | 1188 | 9776 | 336 | 1142 | 2084 |
| k = 130 × 10³ | 130 × 10³ | 4496 | 137 × 10³ | 15757 | 130 × 10³ | 4451 | 151 × 10³ | 2764 |
| Precision Error | 0.0036 | 0.0044 | 0.0514 | 0.1047 | 0.0035 | 0.0043 | 0.2162 | 0.6796 |

The performance of PARSIM is next evaluated in application to two nonlinear models. The first model is a nonlinear two compartment model of drug kinetics in the human body, which is shown to have near nonidentifiable parameters. The second model is the Van der Pol oscillator, which in addition to being structurally nonidentifiable, due to numerous local minima, exhibits bifurcation characteristics 40 and has been a benchmark of adaptation.

The drug kinetics model has the form:

$$\dot{x}_1(t) = -\left(k_{21} + \frac{V_M}{k_m + x_1(t)}\right)x_1(t) + k_{12}x_2(t) + b_1 u(t) \qquad (37)$$

$$\dot{x}_2(t) = k_{21}x_1(t) - (k_{02} + k_{12})x_2(t)$$

$$y(t) = c_1 x_1(t)$$

which represents the drug injected into the blood (compartment 1) as it exchanges linearly with the tissues (compartment 2). The drug is irreversibly removed with a nonlinear saturation characteristic (Michaelis-Menten dynamics) from compartment 1 and linearly from compartment 2. The experiment takes place in compartment 1. The state variables $x_1$ and $x_2$ represent drug masses in the two compartments, $u(t)$ denotes the drug input, $y(t)$ is the measured drug, $k_{12}$, $k_{21}$, and $k_{02}$ denote constant parameters, $V_M$ and $K_m$ are classical Michaelis-Menten parameters, and $b_1$ and $c_1$ are input and output parameters. For simulation purposes, the parameter values were obtained from Carson et al. 37 to represent galactose intake per kg body weight (kg B W), as:

$$\Theta^* = [k_{21}^*, k_{12}^*, V_M^*, K_m^*, k_{02}^*, c_1^*, b_1^*] = [3.033, 2.4, 378, 2.88, 1.5, 1.0, 1.0] \qquad (38)$$

Using the nominal parameters:

$$\overline{\Theta} = [\overline{k}_{21}, \overline{k}_{12}, \overline{V}_M, \overline{K}_m, \overline{k}_{02}, \overline{c}_1, \overline{b}_1] = [2.8, 2.6, 378, 2.88, 1.6, 1.0.1.0] \qquad (39)$$

the system response to a single dose of drug $x_1(0)=0.2$ mg/100 ml kg B W, $x_2(0)=0$ was simulated. The parameter effects of $k_{21}$, $k_{12}$, and $k_{02}$ obtained from simulation are shown in FIGS. 14A-14C with the correlation coefficient values:

$$\rho_{k_{21}k_{12}} = 0.9946 \quad \rho_{k_{21}k_{02}} = -0.9985 \quad \rho_{k_{12}k_{02}} = -0.9888 \qquad (40)$$

As observed from these results, the correlation coefficients between the three parameter effect pairs are very close to 1, indicating near mutual nonidentifiability of the three parameters, even though the structural identifiability of the parameters has been verified by Audoly et al., "Global Identifiability of Nonlinear Models of Biological Systems," IEEE Trans on Biomedical Eng., Vol. 48, No. 1 pp. 55-65 (2001), the entire contents of which is incorporated herein by reference. According to these results, it can be very difficult to extract reliable signatures for these parameters. To verify this point, the signatures of the three parameters $k_{21}$, $k_{12}$, and $k_{02}$ were extracted using the Gauss WT. Based on these signatures, the parametric errors were estimated according to $\widehat{\Delta \Theta} = [\widehat{\Delta k_{21}} \cdot \widehat{\Delta k_{12}} \cdot \widehat{\Delta k_{02}}] = [0.1942, 0, 0]$ which are null for $k_{12}$, and $k_{02}$ due to our inability to extract signatures for these two parameters.

For adaptation purposes, the output $\hat{y}(t, \hat{\Theta})$ of the drug kinetics model described in Carson et al, "The Mathematical Modeling of Metabolic and Endocrine Systems," John Wiley and Sons (1983), the contents of which is incorporated herein by reference, was simulated. Both PARSIM and the Gauss-Newton method were used to adapt the parameters $k_{21}$, $k_{12}$, and $k_{02}$, which deviated from their true values. The adapted parameters, shown in FIGS. 15A and 15B, indicate that the near nonidentifiability of the parameters of this model makes adaptation impossible by either method. However, the results reveal another inherent characteristic of the two methods. In PARSIM's case, the near nonidentifiability of the parameters impedes signature extraction for two of the parameters, so these parameters remain unchanged at their initial values. In the Guass-Newton method's case, on the other hand, all three parameters are adapted to minimize the error, but due to near nonidentifiability, adaptation is completely ineffective and the adapted parameters never approach their true values.

Figure 16:
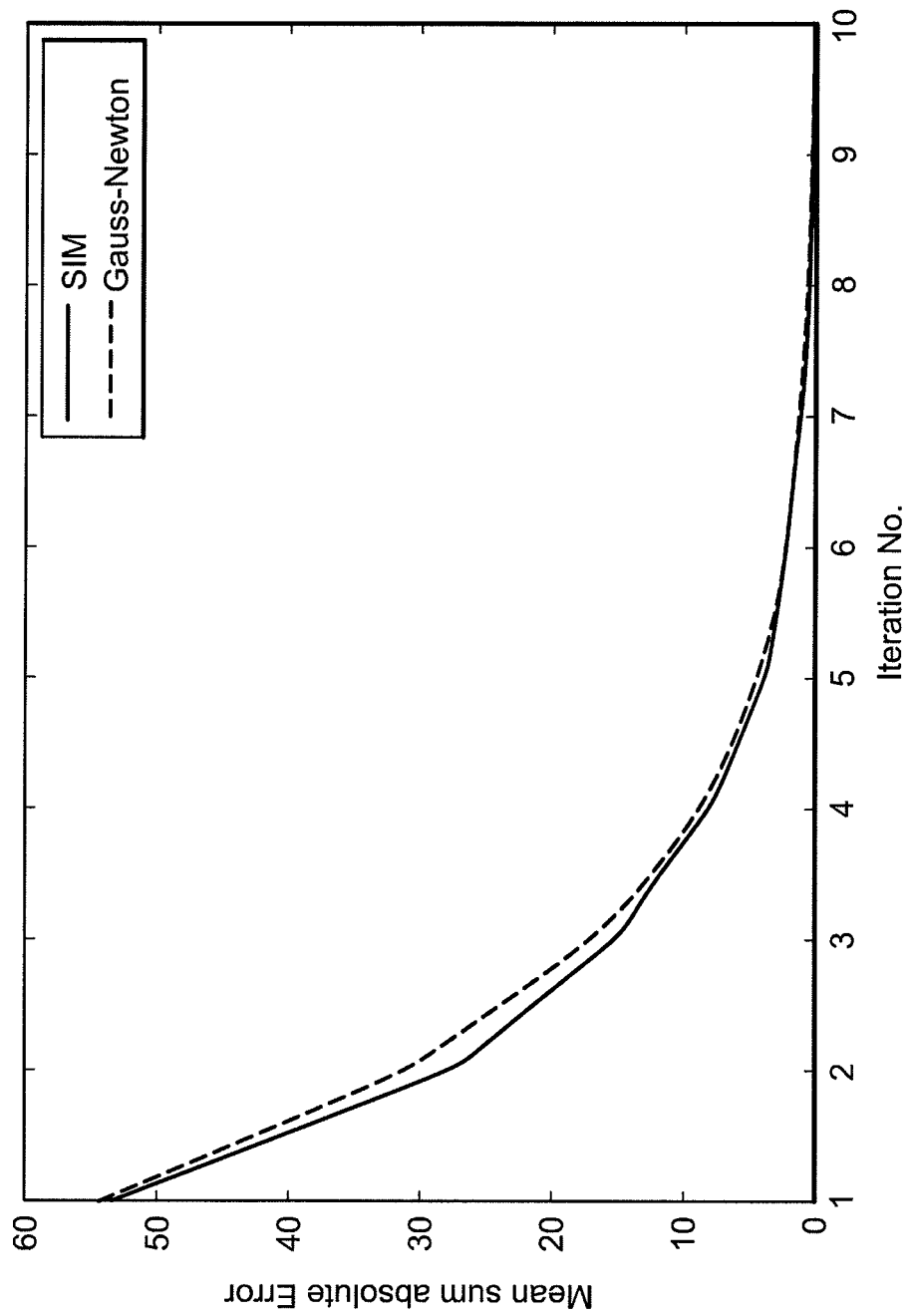
FIG. 16 graphically illustrates the mean prediction error of one hundred adaptation procedures of a Van der Pol oscillator parameters by the present invention (PARSIM) and the Gauss Newton model.

The Van der Pol oscillator has the form:

$$m \frac{d^2 x}{dt^2} - c(1-x^2) \frac{dx}{dt} + kx = 0 \tag{40}$$

with its true parameters defined as $\Theta^* = [m^*, c^*, k^*] = [375, 9800, 130 \times 10^3]^T$. The Van der Pol oscillator was simulated with the initial conditions $x(0)=0.02$, and as with the mass-spring-damper model, the adaptation convergence of PARSIM was tested with one hundred different initial parameter values within 10% of $\Theta^*$. Both PARSIM and the Guass-Newton method were applied to this model with a step size of $\mu=0.50$. The threshold value for PARSIM was $\eta=0.20$. The mean value of the adapted parameters and their standard deviations at the twenty-fifth iteration of the two methods are listed in Table 6. As observed from the results, the two methods are similar in that they do not consistently converge to the global minimum. The results, however, indicate that PARSIM provides a more accurate estimate of this model's parameters, in part due to its more frequent convergence to the global minimum among the adaptation runs. Also shown for this model in FIG. 16, are plots of the mean prediction errors during the one hundred adaptation runs of the two methods. They indicate that PARSIM has a similar performance to the Gauss-Newton method in error minimization even though its focus is solely on parametric error reduction.

The results presented so far highlight important features of PARSIM and its potential advantages. All of these results, however, have been obtained with a threshold value of $\eta=0.2$ and the Gauss wavelet transform. It is, therefore, of interest to examine the effect of other threshold values and other wavelets on the performance of PARSIM.

A further study of the effect of the threshold level $\eta$ on the extracted signatures, entails an extensive investigation of this effect on the size of parameter signatures and the regions of the time-scale plane they occupy. It can also involve evaluation of the consistency of parametric error estimates obtained, which can in turn influence the robustness of adaptation. Here, the effect of the threshold level on the quality of adaptation of the mass-spring-damper model parameters is considered. The mean estimates from one hundred adaptation runs of the mass-spring-damper model parameters with noise-contaminated output obtained with three different threshold levels are shown in Table 7. As before, the initial parameter values in each adaptation run were randomly selected within 25% of the true parameter values. The mean estimates indicate the highest precision is associated with a threshold level of $\eta=0.2$, although the standard deviation of the estimates seems to decrease with the higher threshold levels. The smaller standard deviations can be attributed to the smaller number of pixels included within each parameter signature due to the elimination of a larger portion of the parameter effects wavelet coefficients. However, these more concentrated parameter signatures do not seem to contribute to more precise estimates, perhaps due to the smaller number of pixels used for averaging the parametric error estimates used previously.

TABLE 6

Twenty fifth-iteration mean and standard deviation values of the adapted Van der Pol oscillator parameters from one hundred adaptation runs of PARSIM and the Gauss-Newton method. Random initial parameter values were used for each adaptation run within 10% of the true values.

| True | Parameter Estimates | | | |
|---|---|---|---|---|
| Parameter | PARSIM | | Gauss-Newton | |
| Value | Mean | St. Dev. | Mean | St. Dev. |
| m = 375 | 380 | 16.17 | 385 | 17.87 |
| c = 9800 | 9921 | 422.32 | 1006 | 467.11 |
| k = 130 × 10³ | 131.6 × 10³ | 5.605 × 10³ | 133.5 × 10³ | 6.196 × 10³ |
| Precision Error | 0.0060 | | 0.0089 | |

TABLE 7

Twenty fifth-iteration mean estimates by PARSIM of the mass-spring-damper model parameters with noisy output and different threshold levels. The estimates were obtained using one hundred different initial parameter values randomly selected within 25% of the correct values.

| True Parameter Value | Parameter Estimates | | | | | |
|---|---|---|---|---|---|---|
| | $\eta = 0.1$ | | $\eta = 0.2$ | | $\eta = 0.3$ | |
| | Mean | St. Dev. | Mean | St. Dev. | Mean | St. Dev. |
| m = 375 | 346 | 5.9 | 387 | 5.77 | 394 | 4.46 |
| c = 9800 | 9257 | 39.25 | 9619 | 47.35 | 9695 | 34.39 |
| k = 130 × 10³ | 121.87 × 10³ | 1258 | 130.48 × 10³ | 414.84 | 131.79 × 10³ | 317.82 |
| Precision Error | 0.0133 | | 0.0016 | | 0.0030 | |

There is considerable literature on the smoothing effect of different wavelet transforms and the edges associated with these transforms. Here, consider an empirical study of the influence of various wavelets on adaptation of the mass-spring-damper model parameters. Mean precision error at the twenty-fifth iteration of one hundred adaptation runs with four different wavelets are shown in Table 8. Results were obtained from signatures across the entire time-scale plane as well as at the edges of the prediction error. The results indicate that the Gauss wavelet, which was used for all our previous results, provides the best precision, although the Morlet and Mexican Hat wavelets are not far behind. Although the Gauss wavelet provides decent results for signatures across the entire time-scale plane, it is less effective than the other wavelets when signatures are obtained at the edges of the error. This is perhaps due to the smaller sets of wavelet transform modulus maxima produced by this wavelet relative to others.

TABLE 8

Mean precision error at the twenty fifth-iteration of one hundred adaptation runs of the mass-spring-damper model parameters obtained with different wavelets. Random initial parameter values within 25% of the correct values were used for each adaptation run.

| | True Parameters Precision Error | | | |
|---|---|---|---|---|
| Wavelet Type | Entire time-scale Plane | | At the Edges of Error | |
| | Mean | STD | Mean | STD |
| Gauss | $6.8632 \times 10^{-6}$ | $8.5501 \times 10^{-6}$ | 0.0036 | 0.0040 |
| Gauss | $5.1174 \times 10^{-7}$ | $6.3810 \times 10^{-7}$ | $9.9748 \times 10^{-8}$ | $1.3413 \times 10^{-7}$ |
| Morlet | $5.6952 \times 10^{-5}$ | $6.4121 \times 10^{-5}$ | $1.7723 \times 10^{-7}$ | $2.0145 \times 10^{-7}$ |
| Mexican Hat | $1.2093 \times 10^{-6}$ | $1.5122 \times 10^{-6}$ | $1.3025 \times 10^{-7}$ | $1.7723 \times 10^{-7}$ |

It is shown that isolated pixels within the time-scale domain can be identified where the dynamic effect of individual parameters on the output is dominant. It is also shown that at these pixels the prediction error approximated solely in terms of individual parameters yields a reliable estimate of the parametric error. This makes possible separate approximation of the prediction error in terms of individual parameters in different regions of the time-scale plane, in lieu of one multi-parameter approximation that is commonly used in regression. The adaptation method implemented according to this parametric error minimization strategy exhibits several advantages over traditional regression-based adaptation.

Many changes in the details, materials, and arrangement of parts, herein described and illustrated, can be made by those skilled in the art in light of teachings contained hereinabove. Accordingly, it will be understood that the following claims are not to be limited to the embodiments disclosed herein and the equivalents thereof, and can include practices other than those specifically described.

What is claimed is:

1. A method for determining parameter adaptation with a data processing device comprising:
    transforming a plurality of operating parameters for a system from a time domain to a time scale domain;
    univariately changing an operating parameter value for each of the plurality of operating parameters to provide a separately determined error value for each of the plurality of operating parameters;
    iterating the step of univariately changing the operating parameter value for each of the plurality of operating parameters to determine a convergent error value in the time scale domain;
    determining an adjusted parameter value for at least one of the plurality of operating parameters with the data processing device based on at least one determined convergent error value; and
    using the at least one adjusted parameter value to adjust system operation.

2. The method of claim 1 wherein the method comprises applying a filter to parameter data to obtain the adjusted parameter values.

3. The method of claim 1 further comprising using a computer program operating on the data processing system to obtain a plurality of adjusted parameter values.

4. The method of claim 1 further comprising adjusting model parameters to model machine operation.

5. The method of claim 1 wherein the transformation comprises a wavelet transformation.

6. The method of claim 1 further comprising obtaining a parameter signature.

7. The method of claim 6 wherein the parameter signature comprises a plurality of pixel values in the time scale domain.

8. The method of claim 7 wherein the parameter signature comprises a union of all pixel values in a time scale plane.

9. The method of claim 7 further comprising determining a parametric error value using the plurality of pixel values.

10. The method of claim 9 further comprising determining a parametric error value for a selected parameter of the plurality of operating parameters separately from the parametric error values of non-selected parameters.

11. The method of claim 9 wherein the step of obtaining a parameter signature comprises applying a filter to transformed parameter values.

12. The method of claim 1 further comprising estimating parameter effects by univariately adjusting operating parameter values and subsequently transforming the operating parameter values to the time scale domain.

13. The method of claim 6 wherein the step of changing a parameter value further comprises minimizing the error value associated with a corresponding parameter to obtain the convergent error value.

14. The method of claim 1 further comprising using the adjusted parameter values for a financial modeling program.

15. The method of claim 1 further comprising using the adjusted parameter values to tune a system controller.

16. The method of claim 1 further comprising using the adjusted parameter values with a simulation model.

17. A method for determining parameter adaptation for a machine with a data processing device comprising:
  transforming a plurality of operating parameters of a machine from a time domain to a time scale domain;
  univariately changing an operating parameter value for each of the plurality of operating parameters to provide a separately determined error value for each of the plurality of operating parameters;
  iterating the step of univariately changing the operating parameter value for each of the plurality of operating parameters to determine convergent error values in the time scale domain;
  determining adjusted parameter values for each of the plurality of operating parameters based on the separately determined convergent error values using the data processing device; and
  using the adjusted parameter values to operate the machine.

18. The method of claim 17 wherein the method comprises generating parameter data with the data processing device and applying a filter to the parameter data to obtain the adjusted parameter values.

19. The method of claim 17 wherein the transformation comprises a wavelet transformation.

20. The method of claim 17 wherein the parameter signature comprises a plurality of pixel values in the time scale domain.

21. The method of claim 20 wherein the parameter signature comprises a union of all pixel values in a time-scale plane.

22. The method of claim 20 further comprising determining a parametric error value using the plurality of pixel values.

23. The method of claim 17 further comprising displaying adjusted parameter values.

24. The method of claim 17 further comprising adjusting parameters of a feedback control system for the machine.

* * * * *